(12) United States Patent
Hatano et al.

(10) Patent No.: US 12,714,183 B2
(45) Date of Patent: Aug. 25, 2026

(54) SOCKLINER AND METHOD OF MANUFACTURING THE SAME

(71) Applicant: ASICS CORPORATION, Kobe (JP)

(72) Inventors: Genki Hatano, Kobe (JP); Toshiaki Okamoto, Kobe (JP); Hiroyuki Kusumi, Kobe (JP); Ryota Sakiyama, Kobe (JP); Shingo Takashima, Kobe (JP); Yuta Kawai, Kobe (JP); Satoru Abe, Kobe (JP); Norihiko Taniguchi, Kobe (JP)

(73) Assignee: ASICS CORPORATION, Kobe (JP)

( * ) Notice: Subject to any disclaimer, the term of this patent is extended or adjusted under 35 U.S.C. 154(b) by 105 days.

(21) Appl. No.: 18/346,601

(22) Filed: Jul. 3, 2023

(65) Prior Publication Data

US 2024/0008587 A1 Jan. 11, 2024

(30) Foreign Application Priority Data

Jul. 5, 2022 (JP) ................................ 2022-108429

(51) Int. Cl.
*A43B 7/1405* (2022.01)
*A43B 7/1415* (2022.01)
(Continued)

(52) U.S. Cl.
CPC ............ *A43B 7/141* (2013.01); *A43B 7/1415* (2013.01); *A43B 7/149* (2013.01); *A43B 7/28* (2013.01); *B29D 35/122* (2013.01)

(58) Field of Classification Search
CPC ... A43B 17/006; A43B 1/0009; A43B 13/386; A43B 13/181; A43B 7/082; A43B 7/08
See application file for complete search history.

(56) References Cited

U.S. PATENT DOCUMENTS

| | | | | |
|---|---|---|---|---|
| 12,225,967 | B2 * | 2/2025 | Davis | A43B 13/186 |
| 2002/0050075 | A1 * | 5/2002 | Moretti | A43B 7/125 36/3 R |

(Continued)

FOREIGN PATENT DOCUMENTS

| | | | |
|---|---|---|---|
| DE | 10 2021 121757 | A1 | 12/2021 |
| JP | 2017-533065 | A | 11/2017 |

OTHER PUBLICATIONS

The extended European search report issued by the European Patent Office on Dec. 12, 2023, which corresponds to European Patent Application No. 23182041.6-1015 and is related to U.S. Appl. No. 18/346,601.

(Continued)

*Primary Examiner* — Grady Alexander Nunnery
(74) *Attorney, Agent, or Firm* — Studebaker Brackett PLLC

(57) ABSTRACT

A sockliner includes: a base layer portion formed of a three-dimensional mesh structure body; and an upper layer portion formed of a sheet-like structure body that covers an upper surface of the base layer portion. The upper layer portion includes a through-hole group including a plurality of holes, and each of the holes is located inward from a peripheral edge of the upper layer portion without reaching the peripheral edge. In a case where a surrounding region is defined as a region between the peripheral edge and a position offset by 4.0 mm inward from the peripheral edge, the through-hole group includes an outermost hole group including a plurality of holes located closest to the peripheral edge so as to overlap with the surrounding region and to align along the peripheral edge.

17 Claims, 21 Drawing Sheets

(51) Int. Cl.

| | |
|---|---|
| ***A43B 7/149*** | (2022.01) |
| ***A43B 7/28*** | (2006.01) |
| ***B29D 35/12*** | (2010.01) |

(56) References Cited

U.S. PATENT DOCUMENTS

| | | | | |
|---|---|---|---|---|
| 2005/0198859 | A1* | 9/2005 | Basso | A43B 7/08 36/3 B |
| 2006/0218820 | A1* | 10/2006 | Baden | A43B 21/025 36/34 R |
| 2010/0132222 | A1* | 6/2010 | Kawahara | A61F 5/14 36/43 |
| 2012/0124861 | A1* | 5/2012 | Losani | A43B 7/12 36/28 |
| 2014/0109440 | A1* | 4/2014 | McDowell | A43B 13/16 36/103 |
| 2017/0332733 | A1 | 11/2017 | Cluckers et al. | |
| 2018/0228401 | A1 | 8/2018 | Schwartz et al. | |
| 2019/0381757 | A1* | 12/2019 | Sorm | B32B 3/08 |

OTHER PUBLICATIONS

"Notice of Reasons for Refusal" Office Action issued in JP 2022-108429; mailed by the Japanese Patent Office on Apr. 7, 2026.

* cited by examiner

SOCKLINER AND METHOD OF MANUFACTURING THE SAME

CROSS REFERENCE TO RELATED APPLICATIONS

This nonprovisional application is based on Japanese Patent Application No. 2022-108429 filed on Jul. 5, 2022 with the Japan Patent Office, the entire contents of which are hereby incorporated by reference.

BACKGROUND OF DISCLOSURE

Technical Field of the Disclosure

The present disclosure relates to a sockliner and a method of manufacturing the sockliner.

Background Art

For example, U S. Patent Application Publication No. 2018/228401 discloses a sockliner manufactured by a three-dimensional additive manufacturing method. The sockliner is manufactured in the following manner. Specifically, the foot pressure of a foot of a user who stands upright is first measured at each site on the foot sole of the user. Then, a cell corresponding to the measured foot pressure is selected from a plurality of cells each formed of a three-dimensional lattice structure or the like prepared in advance, and then mapped to each site on the corresponding position on the foot sole, to thereby generate three-dimensional mesh data of the sockliner, and then additively manufacture a sockliner based on the generated three-dimensional mesh data by a three-dimensional additive manufacturing method.

SUMMARY

The sockliner disclosed in the above-mentioned publication is manufactured according to the above-mentioned manufacturing method, with the result that not only a large number of holes are present inside the sockliner but also a large number of holes are exposed to the outside over the entire outer surface of the sockliner. Although such a large number of holes contribute to improvement in performance of the sockliner such as improvement in shock absorbing performance and reduction in weight, these holes may adversely affect the wearing comfort of the user if no measures are taken.

In other words, in the sockliner disclosed in the above-mentioned publication, a large number of holes of various sizes are present also on the upper surface of the sockliner that comes into contact with the foot sole. This causes a problem that what is called a feel of contact for the foot may not be excellent when the user wears footwear equipped with this sockliner.

In addition, since the peripheral edge of the sockliner in a plan view of the upper surface is also continuously rubbed against the footwear worn by the user. Thus, a large number of holes provided to reach the peripheral edge tend to cause damage to the sockliner starting from this peripheral edge, which may lead to a problem of poor durability.

On the other hand, in the case where no hole is provided in the peripheral edge of the sockliner in order to solve the above-described problem, considering that the peripheral edge is thinly formed to conform to the shape of the inner bottom surface of the footwear, not only the shock absorbing performance becomes insufficient in the peripheral edge, but also the portion in this peripheral edge is more rigid than other portions. Accordingly, the user who wears the footwear may feel uncomfortable.

Thus, the present disclosure has been made to solve the above-described problems, and an object of the present disclosure is to provide a sockliner achieving high performance, an excellent feel of contact for a foot, and excellent durability, and a method of manufacturing the sockliner.

A sockliner according to the present disclosure includes: a forefoot portion that supports a toe portion and a ball portion of a foot of a user; a midfoot portion that supports an arch portion of the foot of the user; and a rearfoot portion that supports a heel portion of the foot of the user. The sockliner is also dispose on an inner bottom surface of footwear for use. The sockliner includes: a base layer portion disposed with a lower surface facing the inner bottom surface of the footwear; and an upper layer portion configured to cover an upper surface of the base layer portion. The base layer portion includes a three-dimensional mesh structure body in which a unit structure is repeatedly arranged in multiple arrays, the unit structure having at least one of a three-dimensional lattice structure and a three-dimensional wall structure. The upper layer portion is formed of a sheet-like structure body including a through-hole group including a plurality of holes penetrating through the upper layer portion in a thickness direction of the upper layer portion. Each of the holes included in the through-hole group is located inward from a peripheral edge of the upper layer portion without reaching the peripheral edge of the upper layer portion. In the sockliner according to the present disclosure, in a case where a surrounding region is defined as a region between the peripheral edge of the upper layer portion and a position offset by 4.0 mm inward from the peripheral edge of the upper layer portion, the through-hole group includes an outermost hole group including a plurality of holes located closest to the peripheral edge of the upper layer portion so as to overlap with the surrounding region and to align along the peripheral edge of the upper layer portion.

A method of manufacturing a sockliner according to a first aspect of the present disclosure is a method for manufacturing the sockliner according to the present disclosure, in which the base layer portion and the upper layer portion are formed of a single component, and the base layer portion and the upper layer portion that are formed of a single component are formed of a single additively manufactured product produced by a vat polymerization three-dimensional additive manufacturing method. The method includes: producing the base layer portion; and producing the upper layer portion. In the method of manufacturing the sockliner according to the first aspect of the present disclosure, in the producing of the base layer portion and the producing of the upper layer portion, by a vat polymerization three-dimensional additive manufacturing method, the base layer portion and the upper layer portion are simultaneously and sequentially accumulated from a rear end area of the rearfoot portion to a front end area of the forefoot portion by additive manufacturing.

A method of manufacturing a sockliner according to a second aspect of the present disclosure is a method for manufacturing the sockliner according to the present disclosure, in which the base layer portion and the upper layer portion are formed of a single component, and the base layer portion and the upper layer portion that are formed of a single component are formed of a single additively manufactured product produced by a vat polymerization three-dimensional additive manufacturing method. The method includes: producing the base layer portion; and producing the upper layer portion. In the method of manufacturing a sockliner according to the second aspect of the present disclosure, in the producing of the base layer portion and the producing of the upper layer portion, by a vat polymerization three-dimensional additive manufacturing method, at least a part of the base layer portion is simultaneously and sequentially accumulated from a side of the lower surface of the base layer portion in a direction orthogonal to the lower surface of the base layer portion, and subsequently, at least a part of the upper layer portion is simultaneously and sequentially accumulated by additive manufacturing.

The foregoing and other objects, features, aspects, and advantages of the present disclosure will become apparent from the following detailed description of the present disclosure, which is understood in conjunction with the accompanying drawings.

BRIEF DESCRIPTION OF THE DRAWINGS

FIG. 4 is a plan view of the sockliner shown in FIG. 1.

FIG. 8 is a plan view showing only an upper layer portion of the sockliner shown in FIG. 1.

FIG. 10 is a schematic diagram showing a thickness distribution of the upper layer portion of the sockliner shown in FIG. 1.

FIG. 17 is a schematic diagram showing a thickness distribution of an upper layer portion of a sockliner according to a second modification.

DETAILED DESCRIPTION

Figure 1:
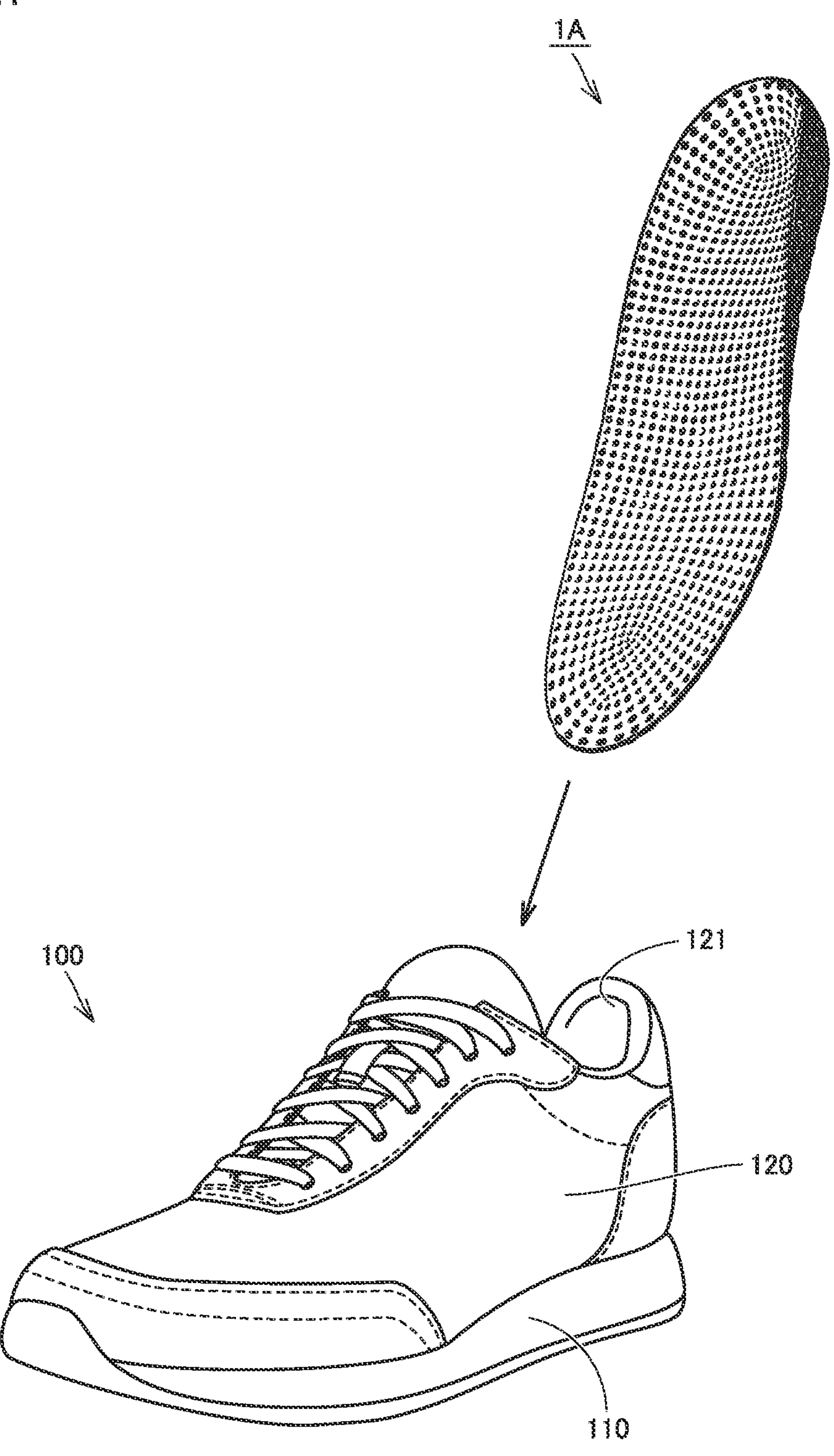
FIG. 1 is a schematic diagram for illustrating a use mode of a sockliner according to a first embodiment.

The following describes embodiments of the present disclosure in detail with reference to the accompanying drawings. In the following embodiments, the same or common portions are denoted by the same reference characters in the figures, and the description thereof will not be repeated

First Embodiment

Figure 2:
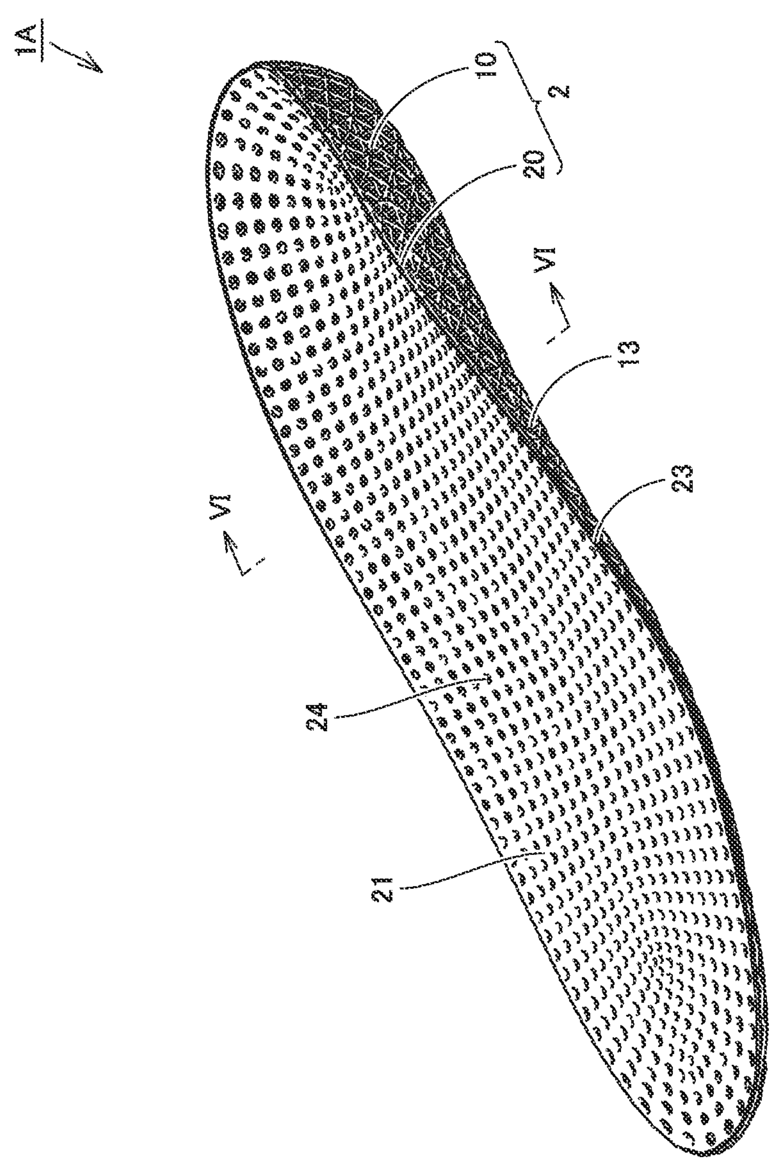
FIG. 2 is a perspective view of the sockliner shown in FIG. 1 as viewed from the obliquely upper right front side.
Figure 3:
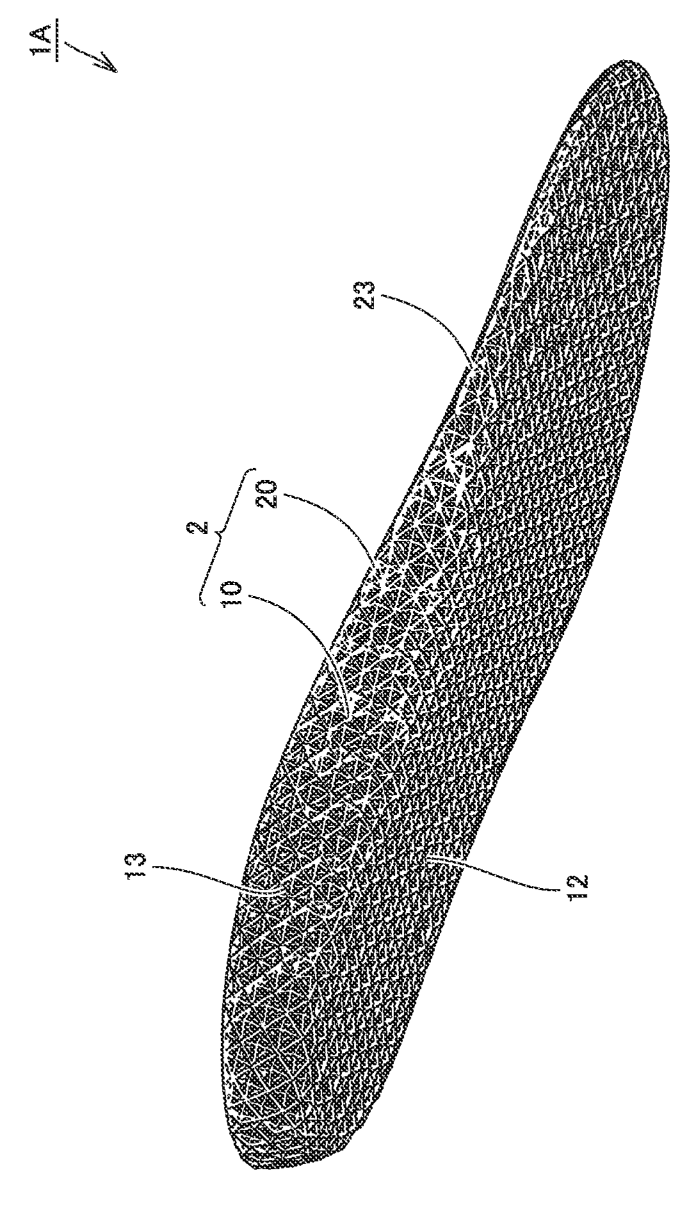
FIG. 3 is a perspective view of the sockliner shown in FIG. 1 as viewed from the obliquely lower left rear side.
Figure 4:
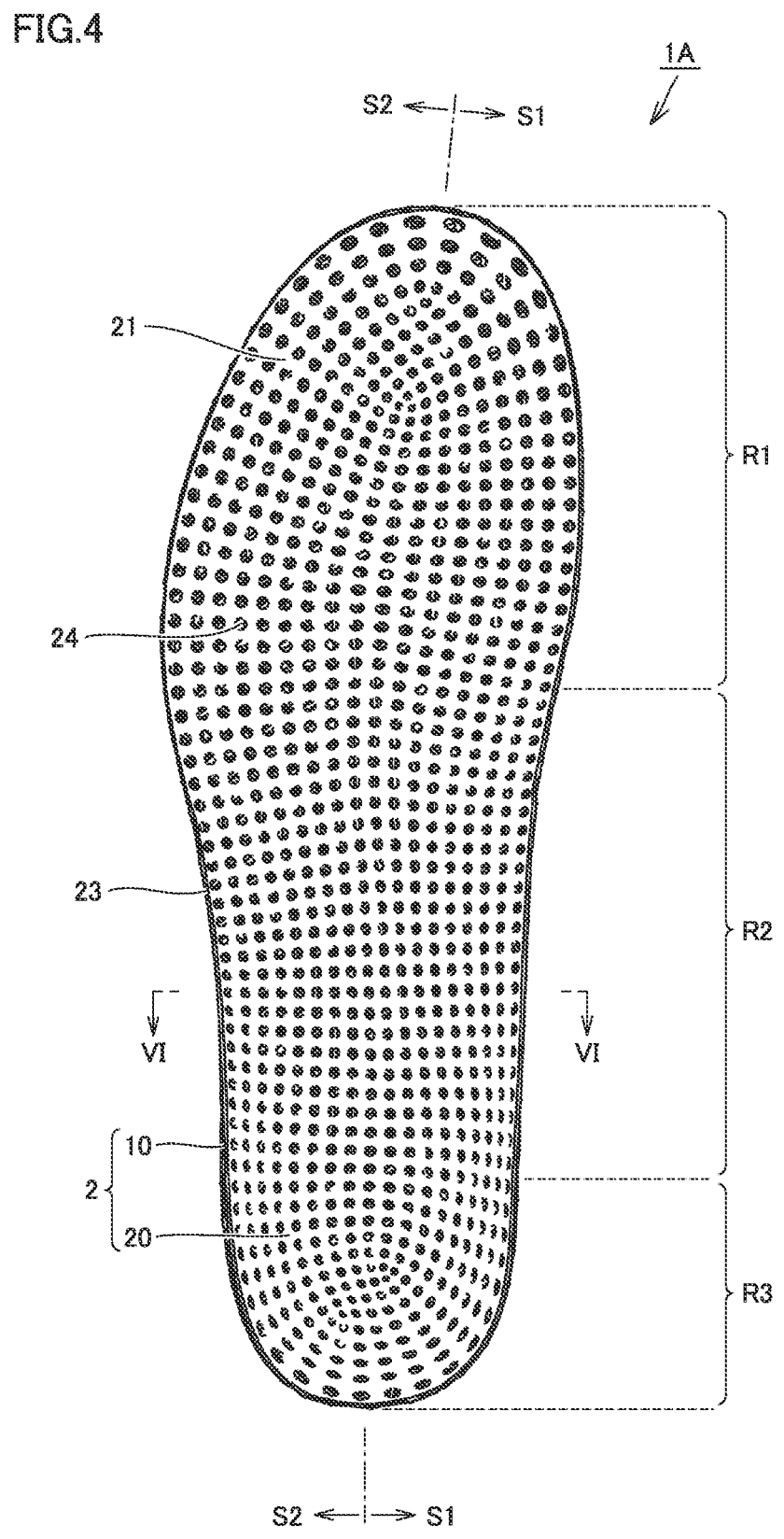
Figure 5:
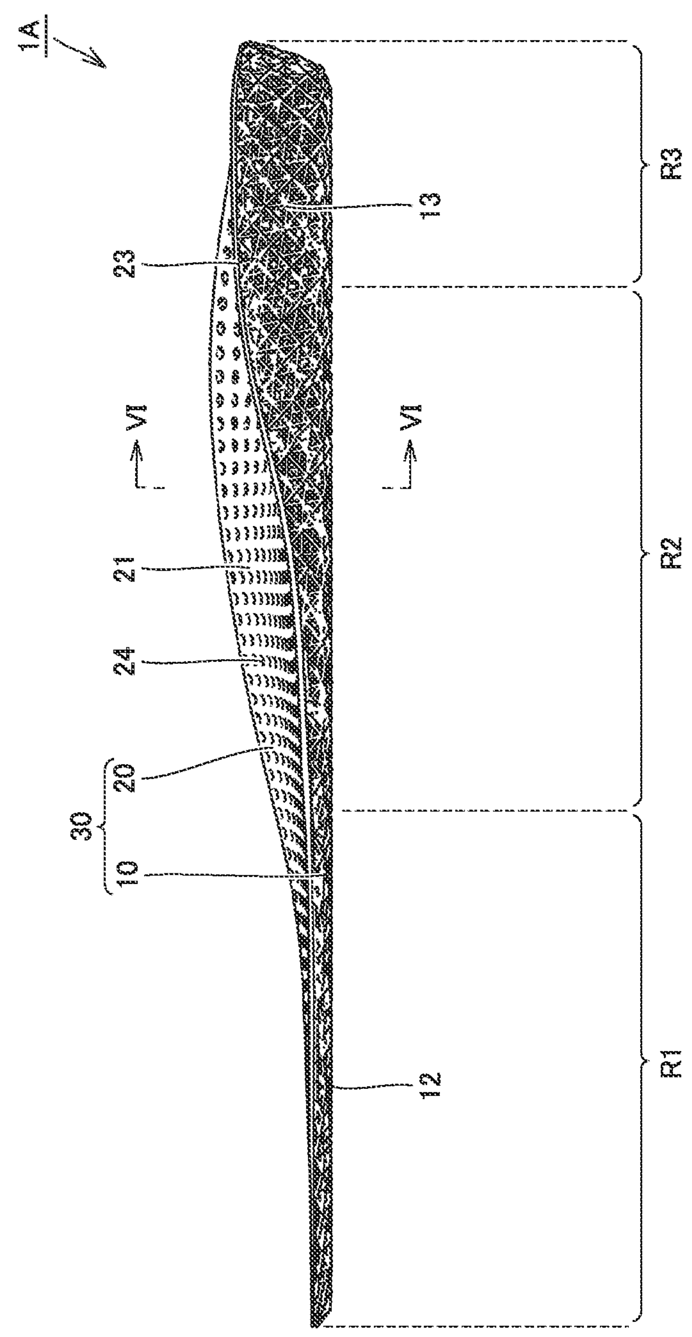
FIG. 5 is a side view of the sockliner shown in FIG. 1 as viewed from the lateral foot side.
Figure 6:
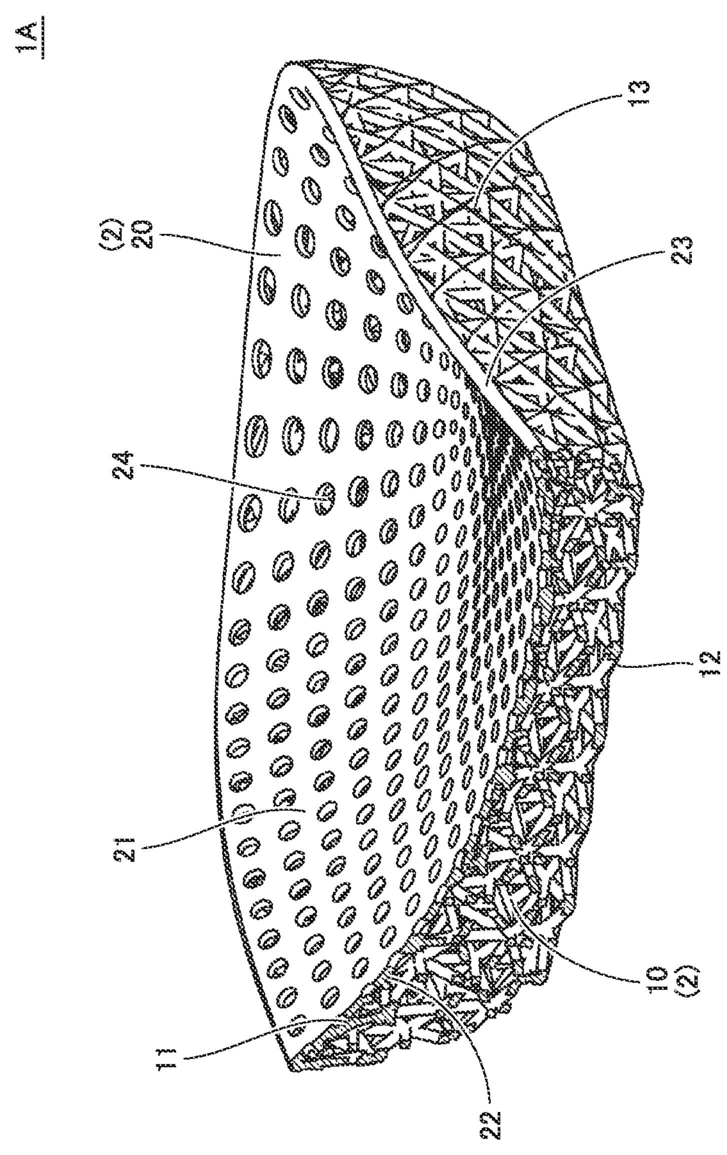
FIG. 6 is a partially cutaway perspective view of the sockliner shown in FIG. 1 taken along a line VI-VI shown in FIGS. 2, 4, and 5.

FIG. 1 is a schematic diagram for illustrating a use mode of a sockliner according to the first embodiment, and FIGS. 2 and 3 are perspective views of the sockliner shown in FIG. 1 as viewed from the obliquely upper right front side and the obliquely lower left rear side, respectively. FIG. 4 is a plan view of the sockliner shown in FIG. 1, and FIG. 5 is a side view of the sockliner shown in FIG. 1 as viewed from the lateral foot side. FIG. 6 is a partially cutaway perspective view of the sockliner shown in FIG. 1 taken along a line VI-VI shown in FIGS. 2, 4, and 5. Referring to FIGS. 1 to 6, a schematic configuration of a sockliner 1A according to the present embodiment will be first described.

As shown in FIG. 1, the sockliner 1A is placed for use, for example, on a shoe 100 as footwear. The shoe 100 includes a sole 110 and an upper 120. When the shoe 100 is in use, the sockliner 1A is inserted into the shoe 100 through a topline 121 provided in the upper 120. Thus, the sockliner 1A is placed on an inner bottom surface of the shoe 100 such that the lower surface of the sockliner 1A faces the inner bottom surface, so that the sockliner 1A is disposed on the shoe 100.

While a user wears the shoe 100, a foot sole of the user is placed on the upper surface of the sockliner 1A. Thereby, the sockliner 1A is sandwiched between the sole 110 of the shoe 100 and the foot sole of the user, so that the sockliner 1A supports the user's foot.

As shown in FIGS. 2 to 5, the sockliner 1A has a flat shape, and an outer shape of the sockliner 1A in a plan view substantially conforms to the outer shape of the inner bottom surface of the shoe 100. The sockliner 1A is formed of a single component and is formed of an additively manufactured product 2 produced by a vat polymerization three-dimensional additive manufacturing method, which will be described later.

As shown in FIGS. 4 and 5, the sockliner 1A is divided into: a forefoot portion R1 that supports a toe portion and a ball portion of the user's foot, a midfoot portion R2 that supports an arch portion of the user's foot, and a rearfoot portion R3 that supports a heel portion of the user's foot, in a front-rear direction (the up-down direction in FIG. 4, and the left-right direction in FIG. 5) that corresponds to a foot length direction of the wearer's foot in a plan view.

Further, as shown in FIG. 4, when seen in a plan view, the sockliner 1A is divided into a portion on the medial foot side (a portion on the S1 side shown in the figure) and a portion on the lateral foot side (a portion on the S2 side shown in the figure) in the left-right direction corresponding to a foot width direction of the user's foot (in the left-right direction in the figure). In this case, the portion on the medial foot side corresponds to the medial side of the foot in anatomical position (i.e., the side close to the midline) and the portion on the lateral foot side is opposite to the medial side of the foot in anatomical position (i.e., the side away from the midline).

The up-down direction of the sockliner 1A (described later) means a direction corresponding to the thickness direction of the sockliner 1A having a flat shape (i.e., corresponding to the up-down direction in FIG. 5), and more specifically, means a direction orthogonal to both the front-rear direction corresponding to the foot length direction of the user's foot, and the left-right direction corresponding to the foot width direction of the user's foot.

As shown in FIGS. 2 to 6, the sockliner 1A includes a base layer portion 10 and an upper layer portion 20 each configured to form a layer. The base layer portion 10 has an upper surface 11 (particularly see FIG. 6), a lower surface 12, and a peripheral surface 13, and forms a lower portion of the sockliner 1A. The upper layer portion 20 has an upper surface 21, a lower surface 22 (particularly see FIG. 6), and a peripheral surface 23, and covers the upper surface 11 of the base layer portion 10 to form an upper portion of the sockliner 1A. In other words, the sockliner 1A has a two-layer structure including the base layer portion 10 and the upper layer portion 20.

As described above, since the sockliner 1A is formed of a single component, the upper surface 11 of the base layer portion 10 and the lower surface 22 of the upper layer portion 20 are formed to be contiguous to each other. In other words, the upper surface 11 of the base layer portion 10 and the lower surface 22 of the upper layer portion 20 mean boundary surfaces where there is a difference in structure (described later) between the base layer portion 10 and the upper layer portion 20.

The base layer portion 10 is formed of a three-dimensional mesh structure body in which a plurality of unit structures are repeatedly arranged, each of the unit structures having a three-dimensional lattice structure. In this case, in the sockliner 1A according to the present embodiment, a unit structure is repeatedly and continuously arranged in multiple arrays substantially in orthogonal three-axis directions including the front-rear direction, the left-right direction, and the up-down direction as described above, and thus, a large number of holes are provided on the inside of and in the outer surface of the base layer portion 10. The details of the three-dimensional structure of the base layer portion 10 will be described later.

The lower surface 12 of the base layer portion 10 is located to face the inner bottom surface of the shoe 100 when the sockliner 1A is dispose on the shoe 100. The lower surface 12 of the base layer portion 10 is provided with a large number of holes as described above and thereby has an uneven surface with protrusions and recesses, but is substantially flat in an overall view. In this case, the lower surface 12 of the base layer portion 10 may be further provided with symbol portions or design portions such as characters, logos, patterns, and authentication codes as options by additive manufacturing.

On the other hand, the upper layer portion 20 is formed of a sheet-like structure body. The upper layer portion 20 formed of a sheet-like structure body includes a through-hole group including a plurality of holes 24 penetrating through the upper layer portion 20 in its thickness direction (i.e., the up-down direction of the sockliner 1A). The details of the through-hole group including the plurality of holes 24 provided in the upper layer portion 20 will be described later.

The upper surface 21 of the upper layer portion 20 is configured such that a portion corresponding to the forefoot portion R1 entirely has a substantially flat shape, and a portion corresponding to the midfoot portion R2 and the rearfoot portion R3 entirely has a substantially recessed shape, so that the upper surface 21 fits to the foot sole of the user who is wearing the shoe. Although the upper surface 21 of the upper layer portion 20 is provided with the plurality of holes 24 as described above, the upper surface 21 has a smooth shape in an overall view. The upper surface 21 of the upper layer portion 20 is preferably configured to be slipped easily so as to allow the user's foot to be smoothly inserted into the shoe 100 when the user wears the shoe 100, which will be described later.

The material of the sockliner 1A is not particularly limited, but is preferably a resin material or a rubber material by which the sockliner 1A can be additively manufactured by a vat polymerization three-dimensional additive manufacturing method and by which the additively manufactured sockliner 1A has appropriate flexibility, elongation, durability, elasticity, stability and the like. More specifically, when the sockliner 1A is made of resin, examples of resin can be a polyolefin resin, an ethylene-vinyl acetate copolymer (EVA), a polyamide-based thermoplastic elastomer (TPA, TPAE), thermoplastic polyurethane (TPU), or a polyester-based thermoplastic elastomer (TPEE). On the other hand, when the sockliner 1A is made of rubber, for example, butadiene rubber (BR) can be used.

The sockliner 1A can also be formed of a polymer composition. Examples of polymer to be contained in the polymer composition include olefinic polymers such as olefinic elastomers and olefinic resins. Examples of the olefinic polymers include polyolefins such as polyethylene (e.g., linear low density polyethylene (LLDPE), high density polyethylene (HDPE), and the like), polypropylene, ethylene-propylene copolymer, a propylene-1-hexene copolymer, a propylene-4-methyl-1-pentene copolymer, a propylene-1-butene copolymer, an ethylene-1-hexene copolymer, an ethylene-4-methyl-pentene copolymer, an ethylene-1-butene copolymer, a 1-butene-1-hexene copolymer, 1-butene-4-methyl-pentene, an ethylene-methacrylic acid copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer, a propylene-vinyl acetate copolymer, and the like.

The polymer can be an amide-based polymer such as an amide-based elastomer and an amide-based resin. Examples of the amide-based polymer include polyamide 6, polyamide 11, polyamide 12, polyamide 66, polyamide 610, and the like.

The polymer can be an ester-based polymer such as an ester-based elastomer and an ester-based resin. Examples of the ester-based polymer include polyethylene terephthalate, polybutylene terephthalate, and the like.

The polymer can be a urethane-based polymer such as a urethane-based elastomer and a urethane-based resin. Examples of the urethane-based polymer include polyester-based polyurethane, polyether-based polyurethane, and the like.

The polymer can be a styrene-based polymer such as a styrene-based elastomer and a styrene-based resin. Examples of the styrene-based elastomer include a styrene-ethylene-butylene copolymer (SEB), a styrene-butadiene-styrene copolymer (SBS), a hydrogenated product of SBS (a styrene-ethylene-butylene-styrene copolymer (SEBS)), a styrene-isoprene-styrene copolymer (SIS), a hydrogenated product of SIS (a styrene-ethylene-propylene-styrene copolymer (SEPS)), a styrene-isobutylene-styrene copolymer (SIBS), styrene-butadiene-styrene-butadiene (SBSB), styrene-butadiene-styrene-butadiene-styrene (SBSBS), and the like. Examples of the styrene-based resin include polystyrene, acrylonitrile styrene resin (AS), acrylonitrile butadiene styrene resin (ABS), and the like.

Examples of the polymer include acrylic polymers such as polymethylmethacrylate, urethane-based acrylic polymers, polyester-based acrylic polymers, polyether-based acrylic polymers, polycarbonate-based acrylic polymers, epoxy-based acrylic polymers, conjugated diene polymer-based acrylic polymers and hydrogenated products thereof, urethane-based methacrylic polymers, polyester-based methacrylic polymers, polyether-based methacrylic polymers, polycarbonate-based methacrylic polymers, polyester-based urethane acrylate, polycarbonate-based urethane acrylate, polyether-based urethane acrylate, epoxy-based methacrylic polymers, conjugated diene polymer-based methacrylic polymers and hydrogenated products thereof, polyvinyl chloride-based resins, silicone-based elastomers, butadiene rubber, isoprene rubber (IR), chloroprene rubber (CR), natural rubber (NR), styrene-butadiene rubber (SBR), acrylonitrile-butadiene rubber (NBR), butyl rubber (IIR), and the like.

As described above, the sockliner 1A is preferably made of a flexible material, and thus, the sockliner 1A is preferably made particularly of urethane acrylate among the above-mentioned types of materials. The sockliner 1A made of urethane acrylate is not only excellent in durability and elongation but also sufficient in elasticity. As described above, since the sockliner 1A is produced by the vat polymerization three-dimensional additive manufacturing method, the sockliner 1A is to contain a curing agent as a subcomponent.

In this case, the sockliner 1A according to the present embodiment is improved in shock absorbing performance not only in terms of material as described above but also in terms of structure. More specifically, the shock absorbing performance in terms of structure is improved mainly by the base layer portion 10. In contrast, the upper layer portion 20 is provided mainly for the purpose of improving the wearing comfort, which will be hereinafter described in detail.

Figure 7:
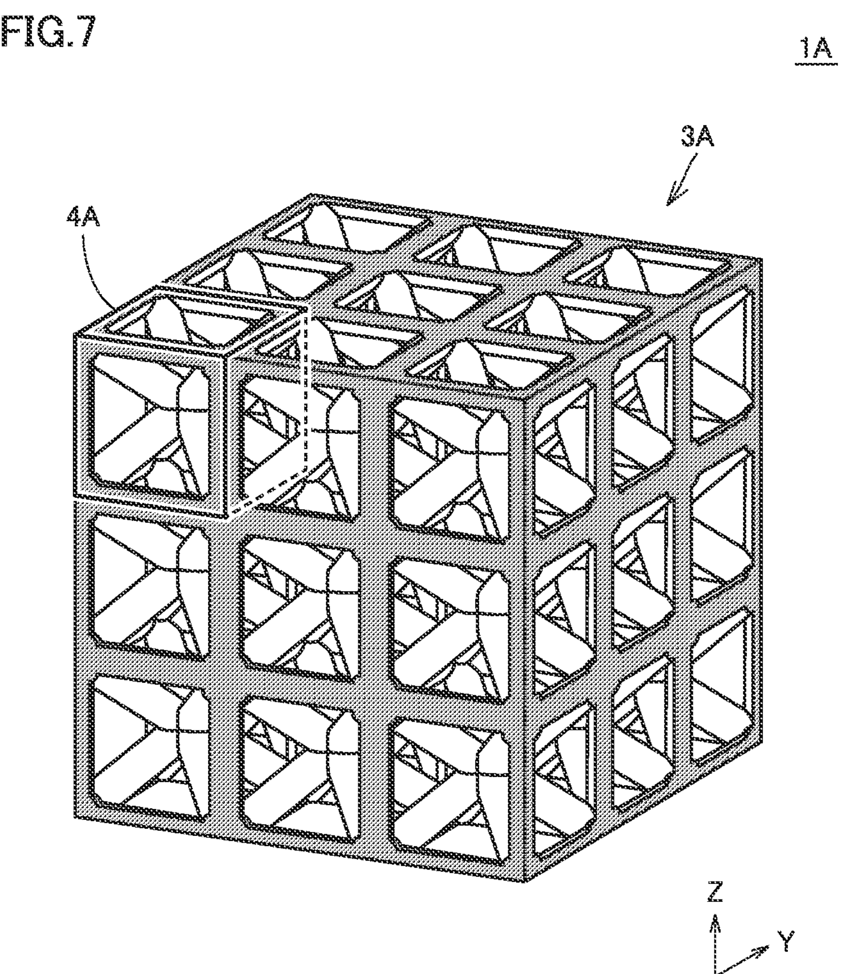
FIG. 7 is a schematic diagram for illustrating a three-dimensional structure of a base layer portion of the sockliner shown in FIG. 1.
Figure 8:
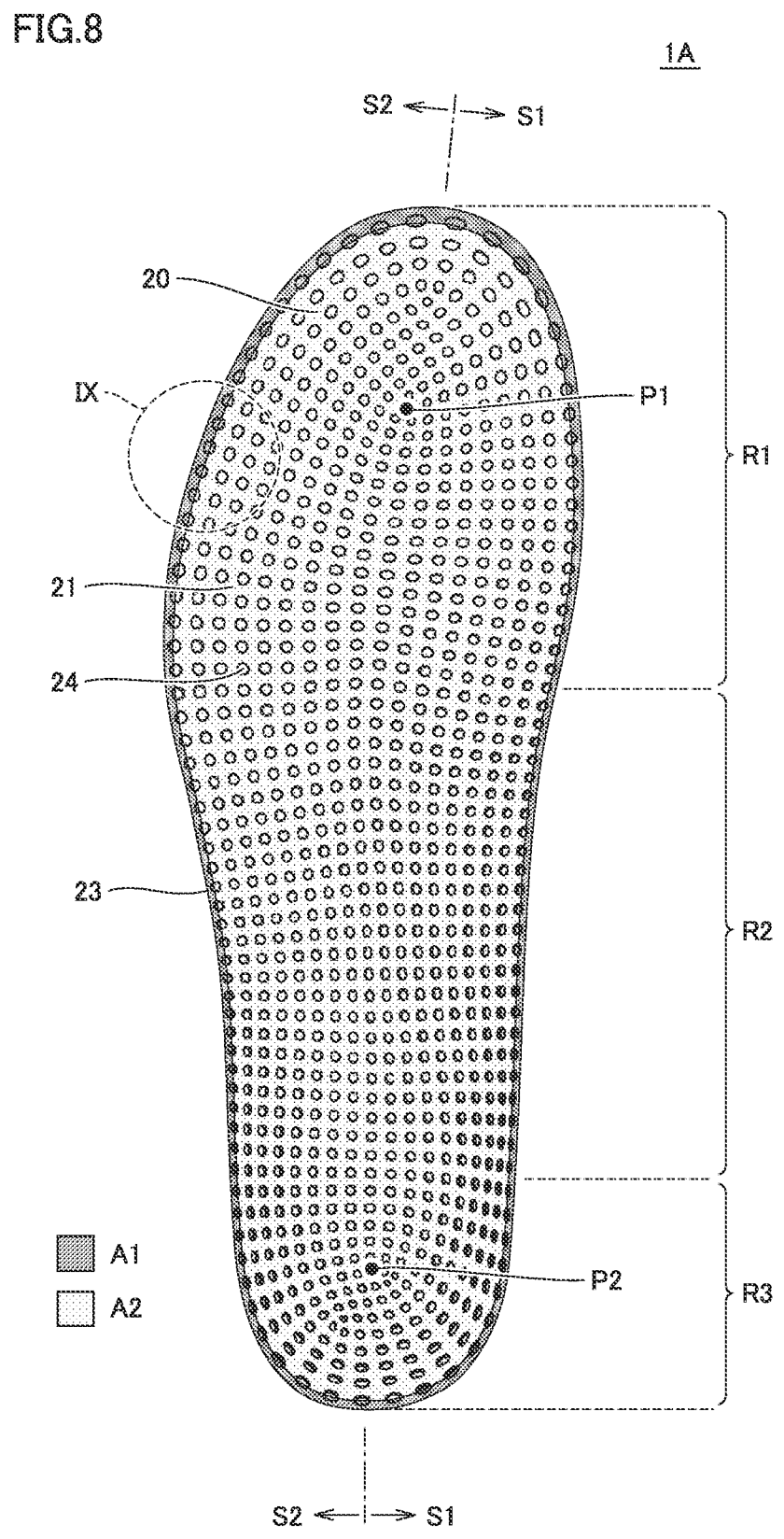
Figure 9:
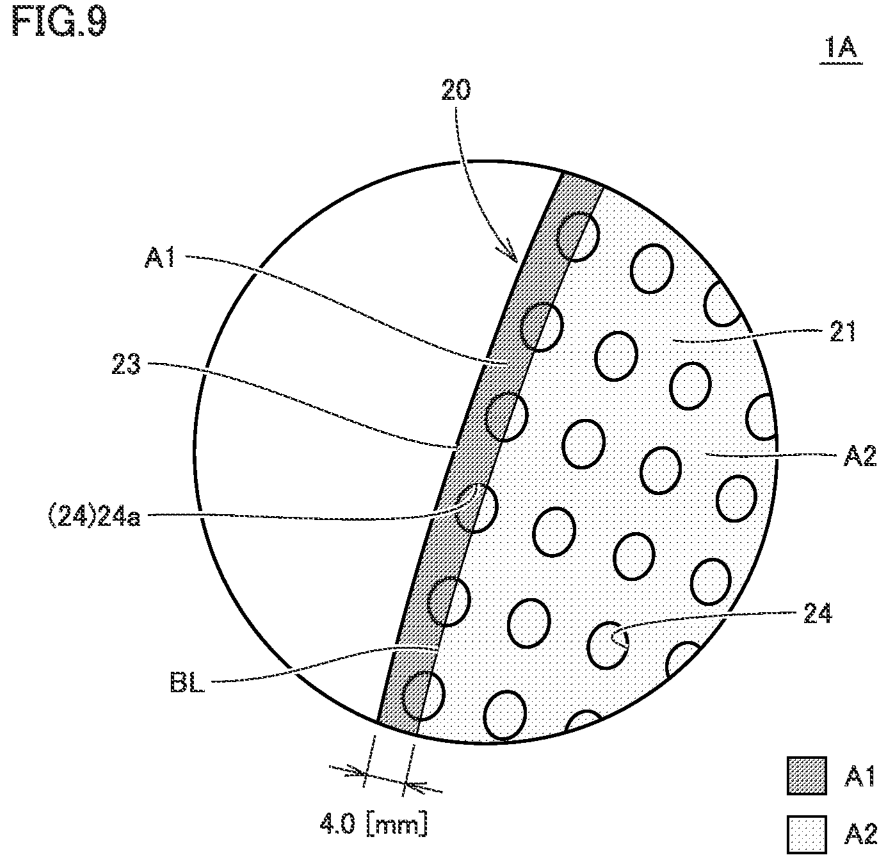
FIG. 9 is an enlarged view of a region IX shown in FIG. 8.
Figure 10:
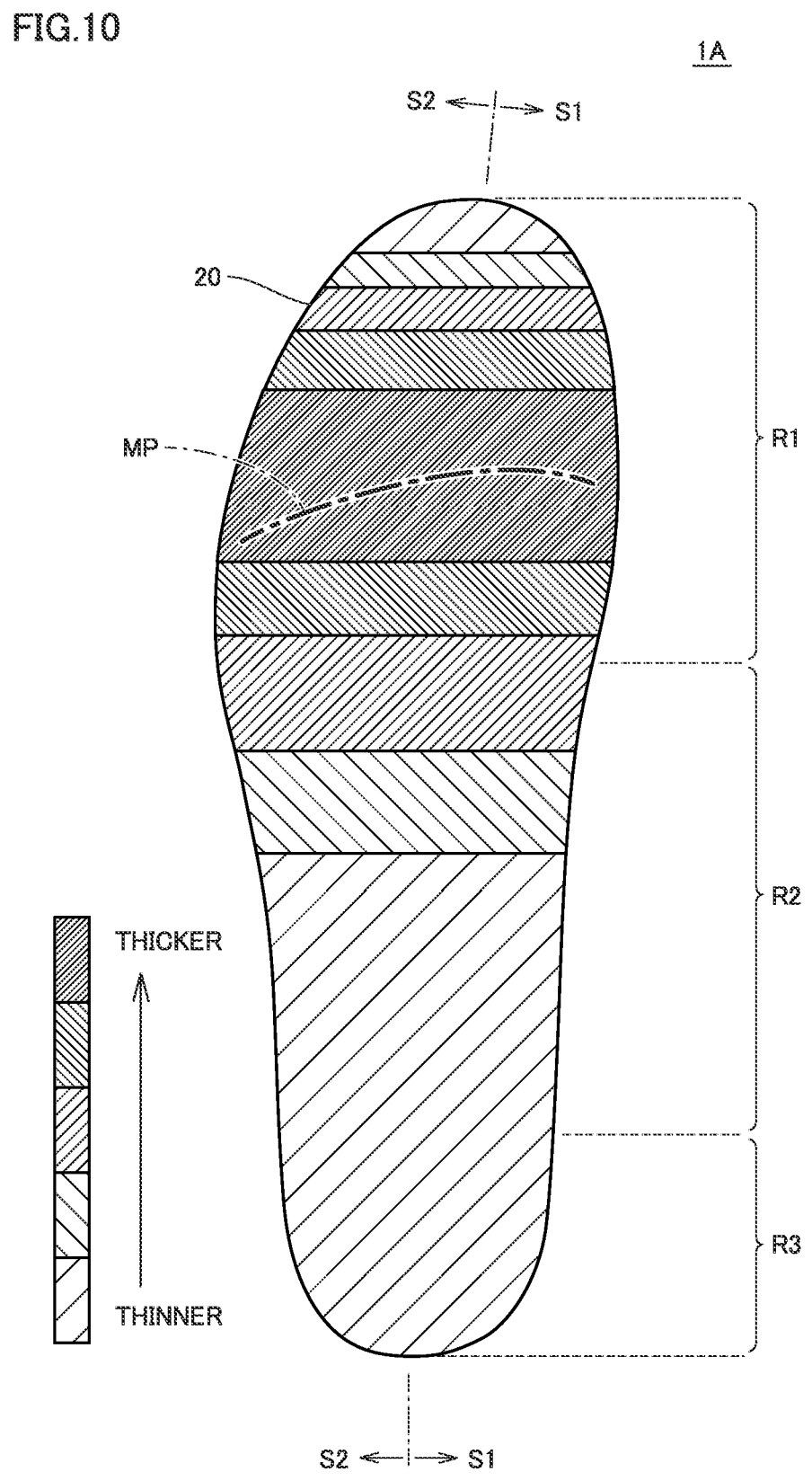

FIG. 7 is a schematic diagram for illustrating a three-dimensional structure of the base layer portion in the sockliner shown in FIG. 1. FIG. 8 is a plan view showing only the upper layer portion of the sockliner shown in FIG. 1, and FIG. 9 is an enlarged view of a region IX shown in FIG. 8. FIG. 10 is a schematic diagram showing a thickness distribution of the upper layer portion of the sockliner shown in FIG. 1.

As shown in FIG. 7, the base layer portion 10 of the sockliner 1A is formed of a three-dimensional mesh structure body 3A in which a plurality of unit structures 4A each having a three-dimensional lattice structure are repeatedly arranged. More specifically, the plurality of unit structures 4A are repeatedly arranged in a regular and continuous manner in each of a width direction (an X direction shown in the figure), a depth direction (a Y direction shown in the figure), and a height direction (a Z direction shown in the figure). In FIG. 7, only the three adjacent unit structures 4A in the width direction, the depth direction, and the height direction are extracted and shown, in which each cutaway surface is shown in a dark color.

The unit structure 4A having a three-dimensional lattice structure has a three-dimensional shape in which a plurality of columns extending in prescribed directions are connected to each other. Various structures can be applicable as the unit structure 4A. For example, various kinds of structures are applicable, such as a rectangular parallelepiped lattice, a diamond lattice, an octahedral lattice, a double pyramid lattice, or a lattice having various supports added thereto. Note that the unit structure 4A shown in the figure is obtained by adding a central support to a rectangular parallelepiped lattice.

When the base layer portion 10 of the sockliner 1A is formed of the three-dimensional mesh structure body 3A as described above, it is preferable to deform each of the unit structures 4A as required such that the outer shape of the three-dimensional mesh structure body 3A conforms to the outer shape of the sockliner 1A. This allows the sockliner 1A to have a smooth outer surface.

The base layer portion 10 configured as described above is disposed in the lower portion of the sockliner 1A to thereby allow the sockliner 1A to have high deformability, which makes it possible to obtain a sockliner achieving excellent wearing comfort with excellent shock absorbing performance and also enhanced in stability during wearing of the shoe. Further, the base layer portion 10 having the above-described configuration makes it possible to obtain a sockliner that is lightweight considering the size of the sockliner and also excellent in air permeability.

The occupied volume ratio of the base layer portion 10 is preferably 5% or more and 50% or less. This configuration allows the sockliner 1A to have high deformability, and further, to be reduced in weight and improved in air permeability.

The occupied volume ratio of the base layer portion 10 can be different in each part of the sockliner 1A. For example, from the viewpoint of supporting the arch of the user's foot, the base layer portion 10 in the midfoot portion R2 is preferably higher in occupied volume ratio than the base layer portion 10 in the forefoot portion R1 and the rearfoot portion R3. Also, from the viewpoint of supporting the collapse of the heel portion (which is called pronation) occurring when the user's foot lands on the ground, the base layer portion 10 on the lateral foot side is preferably higher in occupied volume ratio than the base layer portion 10 on the medial foot side.

In this case, in order to configure the base layer portion 10 to be different in occupied volume ratio for each part of the sockliner 1A, for example, it is conceivable to form the unit structure 4A to be different in size for each part of the sockliner 1A, to form the unit structure 4A to have columns different in thickness for each part of the sockliner 1A, or to form the unit structure 4A to be different in structure for each part of the sockliner 1A.

As shown in FIG. 8, the upper layer portion 20 formed of a sheet-like structure body includes a through-hole group including a plurality of holes 24 penetrating through the upper layer portion 20 in its thickness direction. Each of the plurality of holes 24 included in the through-hole group is exposed at the upper surface 21 of the upper layer portion 20 and faces the base layer portion 10 along the lower surface 22 of the upper layer portion 20. Most of the plurality of holes 24 are in communication with holes provided on the inside of and in the outer surface of the base layer portion 10 along the boundary surface between the upper layer portion 20 and the base layer portion 10.

In this case, each of the plurality of holes 24 included in the through-hole group is located inward from the peripheral edge of the upper layer portion 20 without reaching the peripheral edge (more specifically, the peripheral surface 23) of the upper layer portion 20. In other words, when viewed in the up-down direction of the sockliner 1A (i.e., in the thickness direction of the upper layer portion 20), all of the plurality of holes 24 are located inward at a distance from the peripheral surface 23 and are completely closed in the direction orthogonal to the up-down direction.

Further, the plurality of holes 24 included in the through-hole group are arranged substantially uniformly in the entire area of the upper layer portion 20 when viewed in the up-down direction of the sockliner 1A. In other words, distribution of the plurality of holes 24 for each part of the sockliner 1A is not uneven but is at a substantially constant density.

More specifically, in the sockliner 1A according to the present embodiment, among the plurality of holes 24, the holes located in the region on the front end area of the forefoot portion R1 are arranged substantially radially in dotted lines with respect to a substantially central position P1 of the forefoot portion R1 as a base point, and the holes located in the region on the rear end area of the rearfoot portion R3 are arranged substantially radially in dotted lines with respect to a substantially central position P2 of the rearfoot portion R3 as a base point. Further, the holes located in the region on the rear end area of the forefoot portion R1 are arranged substantially in a matrix, the holes located in the midfoot portion R2 are arranged substantially in a matrix, and the holes located in the region on the front end area of the rearfoot portion R3 are arranged substantially in a matrix. Thus, in the sockliner 1A according to the present embodiment, the plurality of holes 24 are arranged substantially uniformly in the entire area of the upper layer portion 20.

From a different point of view, in the sockliner 1A according to the present embodiment, the plurality of holes 24 are provided in dotted lines so as to substantially linearly connect the substantially central position P1 of the forefoot portion R1 to the substantially central position P2 of the rearfoot portion R3, and the plurality of other holes 24 are provided in dotted lines at positions along closed curves further surrounding, in layers, these substantially linearly arranged holes 24. Thus, in the sockliner 1A according to the present embodiment, the plurality of holes 24 are located substantially uniformly in the entire area of the upper layer portion 20.

As shown in FIGS. 8 and 9, in the case where a surrounding region A1 is defined as a region included between the peripheral edge of the upper layer portion 20 and a position offset by 4.0 mm inward from the peripheral edge of the upper layer portion 20 (a position along a boundary line BL shown in FIG. 9), the through-hole group including the plurality of holes 24 includes an outermost hole group including a plurality of holes 24*a* located closest to the peripheral edge of the upper layer portion 20 so as to overlap with the surrounding region A1 and to align along the peripheral edge of the upper layer portion 20.

While each of the plurality of holes 24*a* included in the outermost hole group is located inward from the peripheral edge of the upper layer portion 20 without reaching the peripheral edge of the upper layer portion 20, the plurality of holes 24*a* are provided to overlap with the surrounding region A1 so as to be located close to the peripheral edge of the upper layer portion 20 (i.e., the peripheral surface 23 of the upper layer portion 20).

In this case, as shown in the figure, a part of each of the plurality of holes 24*a* included in the outermost hole group can overlap with the surrounding region A1, or the plurality of holes 24*a* can entirely overlap with the surrounding region A1. Thereby, the plurality of holes 24*a* included in the outermost hole group are located closer to the peripheral edge of the upper layer portion 20 than the plurality of holes 24 provided to completely overlap with an inner region A2 located on the inside of the surrounding region A1.

Accordingly, by disposing the upper layer portion 20 configured as described above in the upper portion of the sockliner 1A, the upper layer portion 20 covers the base layer portion 10 having the upper surface 11 provided with a large number of fine protrusions and recesses due to the presence of a large number of holes on the inside of and in the outer surface of the base layer portion 10, and also, the upper surface of the sockliner 1A that comes into contact with the user's foot sole is formed of the smooth upper surface 21 of the upper layer portion 20 made of a sheet-like structure body. Therefore, a sockliner achieving an excellent feel of contact for a foot and excellent wearing comfort can be obtained.

In this regard, in the sockliner 1A according to the present embodiment in which the plurality of holes 24 are provided in the upper layer portion 20 as described above, these plurality of holes 24 are provided substantially uniformly in the upper layer portion 20, so that excellent wearing comfort can be achieved without causing uncomfortable feeling to the user who is wearing the shoes. In particular, as described above, the plurality of holes 24*a* included in the outermost hole group in the through-hole group are located to overlap with the surrounding region A1 and also do not reach the peripheral edge of the upper layer portion 20. Thus, as compared with the case where no hole is provided in the peripheral edge of the sockliner, not only high shock absorbing performance can be achieved also in the surrounding region A1, but also the discomfort felt by the user wearing the shoes can be significantly suppressed.

In addition, in the sockliner 1A according to the present embodiment, none of the holes provided in the upper layer portion 20 reaches the peripheral edge of the upper layer portion 20. Accordingly, damage to the peripheral edge that is continuously rubbed against the shoe 100 worn by the user can be significantly suppressed, with the result that a sockliner excellent in durability can be obtained.

Further, by disposing the upper layer portion 20 configured as described above in the upper portion of the sockliner 1A, the area of contact with the foot sole of the user wearing the shoe increases. Thereby, a sockliner enhanced in stability for the foot of the user wearing the shoe can be obtained, and further, a sockliner capable of effectively dispersing the foot pressure can also be obtained. Further, since the base layer portion 10 formed of the three-dimensional mesh structure body 3A is protected by the upper layer portion 20, a sockliner excellent in durability can also be obtained in this respect.

Further, in the case where the upper layer portion 20 of the sockliner 1A is provided with the plurality of holes 24 as described above, an effect of less easily causing a shape defect can be achieved when the sockliner 1A is manufactured by a vat polymerization three-dimensional additive manufacturing method, with the result that the sockliner 1A can be manufactured with high accuracy, which will be described later in detail.

In this case, the plurality of holes 24 included in the through-hole group preferably have a cylindrical shape or an elliptic cylindrical shape. However, the shapes of the plurality of holes 24 are not limited thereto and can be a polygonal column such as a triangular column or a quadrangular column, or can be other shapes. Although the size of each of the holes 24 included in the through-hole group is not particularly limited, for example, its maximum outer dimension in a plan view is preferably about 1.0 mm or more and 5.0 mm or less, and is about 2.0 mm by way of example.

Further, the plurality of holes 24 included in the through-hole group are preferably formed to be substantially larger in opening area toward the peripheral edge of the upper layer portion 20 when viewed in the up-down direction of the sockliner 1A. This configuration can prevent an extremely large difference in rigidity between the central portion and the peripheral edge of the upper layer portion 20 of the sockliner 1A.

Further, in the case where the surface area of the upper surface 21 of the upper layer portion 20 is defined as Sa and the total opening area of the plurality of holes 24 included in the through-hole group in the upper surface 21 of the upper layer portion 20 is defined as Sb, Sa and Sb preferably satisfy the condition of $0.15 \leq Sb/(Sa+Sb) \leq 0.70$. The configuration as described above can reduce the weight and ensure the durability while ensuring the flexibility of the upper layer portion 20.

On the other hand, the thickness of the upper layer portion 20 is preferably 0.5 mm or more and 2.0 mm or less. This is for the purpose of reducing the weight and ensuring the durability while ensuring the flexibility of the upper layer portion 20. In this case, the thickness of the upper layer portion 20 can be the same in the entire region but can be different for each part. In the sockliner 1A according to the present embodiment, the upper layer portion 20 is not uniform in thickness and is configured to have a thickness distribution, specifically, in the range of 0.8 mm or more and 1.4 mm or less.

Specifically, as shown in FIG. 10, in the sockliner 1A, the upper layer portion 20 is configured to be thicker in a substantially central region in the front-rear direction of the forefoot portion R1 than in a region adjacent to the substantially central region. The substantially central region includes a portion that supports a part of the foot sole corresponding to a metacarpophalangeal (MP) joint of the user (a portion denoted by a symbol MP in the figure).

The configuration as described above can enhance the durability of the portion included in the sockliner 1A that receives relatively high foot pressure during landing on the ground and for supporting the part of the foot sole corresponding to the MP joint of the user, and also can effectively disperse the foot pressure, so that high shock absorbing performance can be achieved.

Figures 11A, 11B, 11C:
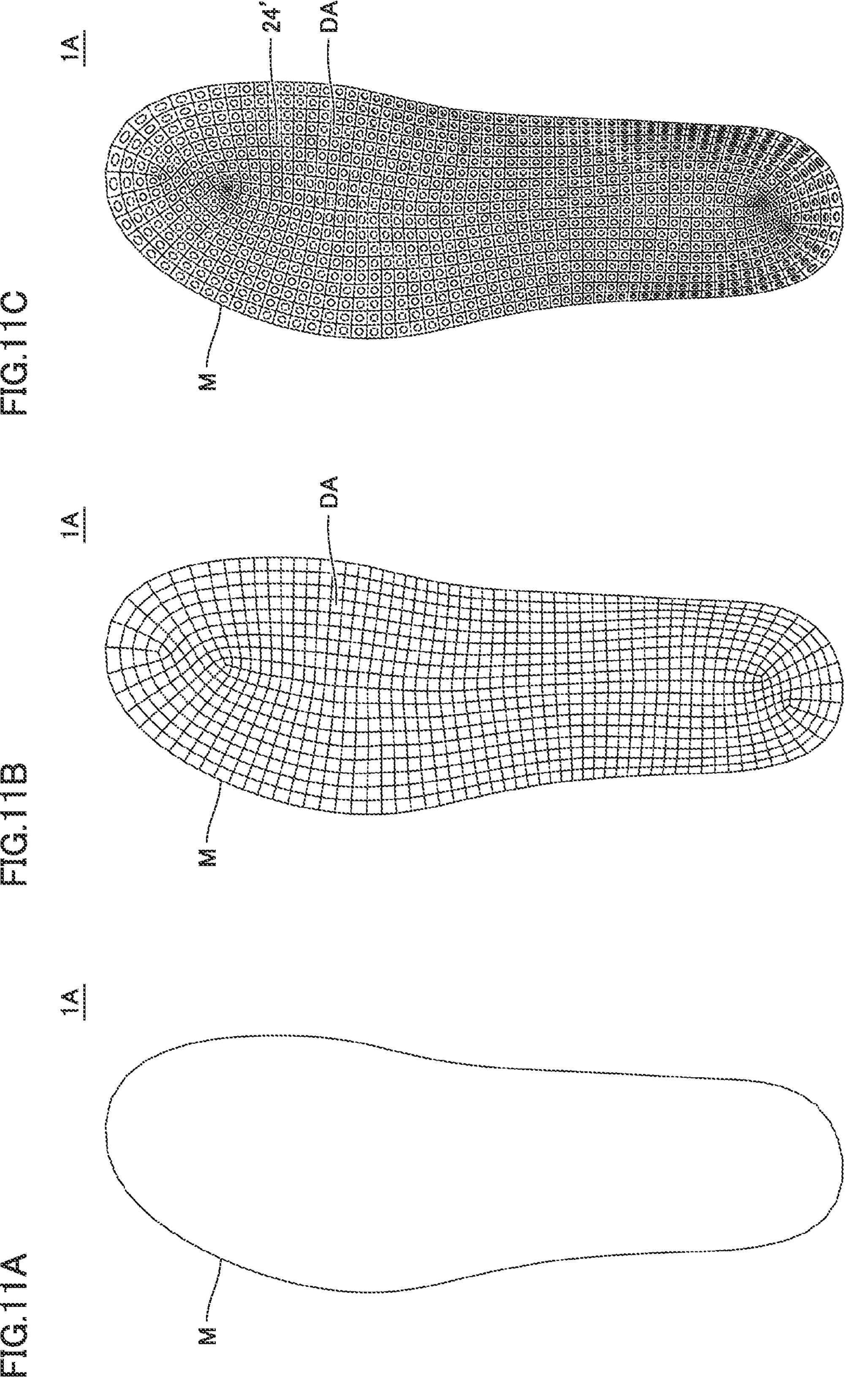
FIGS. 11A to 11C are schematic diagrams each illustrating a mapping method for a plurality of holes provided in the upper layer portion of the sockliner shown in FIG. 1.

FIGS. 11A to 11C are schematic diagrams each illustrating a mapping method for the plurality of holes provided in the upper layer portion of the sockliner shown in FIG. 1. Referring to FIGS. 11A to 11C, the following describes a mapping method for the plurality of holes 24 provided in the upper layer portion 20 when manufacturing the sockliner 1A according to the present embodiment.

The sockliner 1A according to the present embodiment can be manufactured based on the shape data about a standard foot sole prepared in advance for each size of a foot, or can be manufactured based on the shape data about the foot sole obtained by measuring the actual user's foot sole so as to conform to the user's foot. The following describes a method of mapping the plurality of holes 24 to the sockliner 1A based on the shape data about the foot sole obtained by measuring the actual user's foot sole.

First, as shown in FIG. 11A, a sockliner model M is generated based on the shape data about the user's foot sole obtained by the imaging means or the like. The sockliner model M includes an upper surface, a lower surface, and a peripheral surface. Among then, the upper surface corresponds to the upper surface 21 of the upper layer portion 20. The upper surface of the sockliner model M can be formed of one or more curved surfaces, flat surfaces, or a combination thereof, but is normally formed as a three-dimensional surface conforming to the shape of the user's foot sole.

Then, as shown in FIG. 11B, the upper surface of the generated sockliner model M is divided into regions. Specifically, in the present mapping method, the upper surface of the sockliner model M is divided into a plurality of quadrangular divided regions DA adjacent to each other. Thus, the upper surface of the sockliner model M is paved with a large number of quadrangular divided regions DA.

In this case, while various algorithms are conceivable as an algorithm used when the upper surface is divided into regions, the upper surface is preferably divided into regions, for example, such that the area and the side lengths of each quadrangular divided region DA, the internal angle of each vertex thereof, and the like fall within their prescribed ranges. In this way, the entire upper surface of the sockliner model M is substantially equally divided into regions.

Then, as shown in FIG. 11C, a circular or elliptical drawn line 24' having a prescribed size is plotted at a central position in each of the plurality of quadrangular divided regions DA. This drawn line 24' corresponds to an outline of each of the plurality of holes 24 provided in the upper layer portion 20, and thus, mapping of the plurality of holes 24 provided in the upper layer portion 20 is completed.

Applying such a mapping method makes it possible to easily manufacture the sockliner 1A in which the plurality of holes 24 included in the through-hole group are arranged substantially uniformly in the entire area of the upper layer portion 20, when viewed in the thickness direction of the upper layer portion 20.

Although not specifically described herein, by appropriately setting the above-mentioned algorithm, each of the plurality of holes 24*a* to be arranged in the portion closest to the peripheral edge of the upper layer portion 20 (i.e., the plurality of holes included in the outermost hole group) so as to align along the peripheral edge of the upper layer portion 20 can be located to overlap with the surrounding region A1 (i.e., the region included between the peripheral edge of the upper layer portion 20 and the position offset by 4.0 mm inward from the peripheral edge of the upper layer portion 20).

Figure 12:
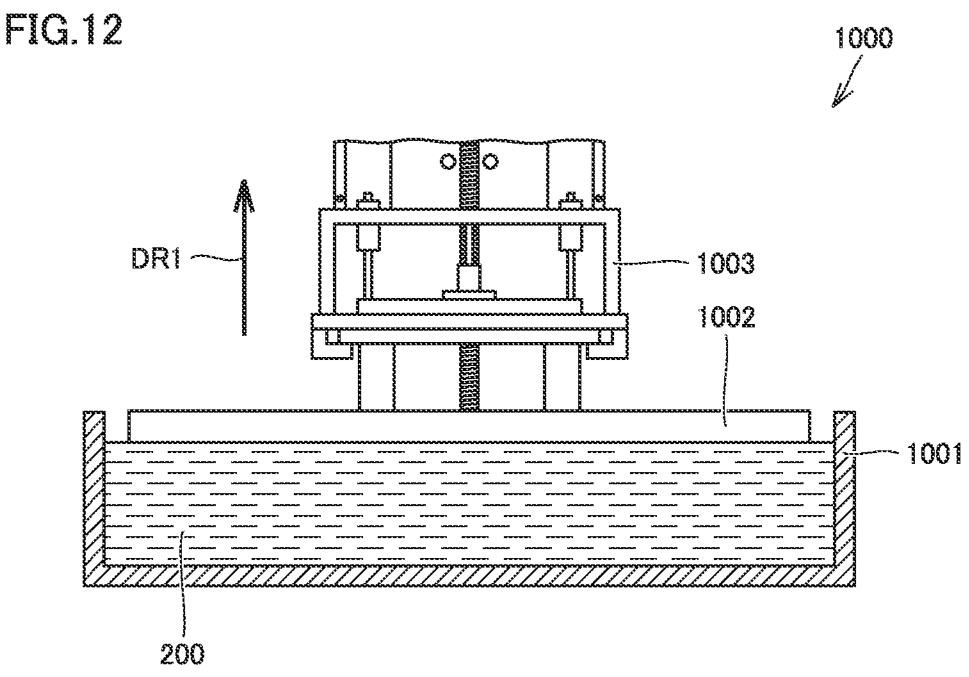
FIG. 12 is a schematic diagram showing a state at the start of additive manufacturing of the sockliner by a three-dimensional additive manufacturing method in a method of manufacturing the sockliner according to the first embodiment.
Figure 13:
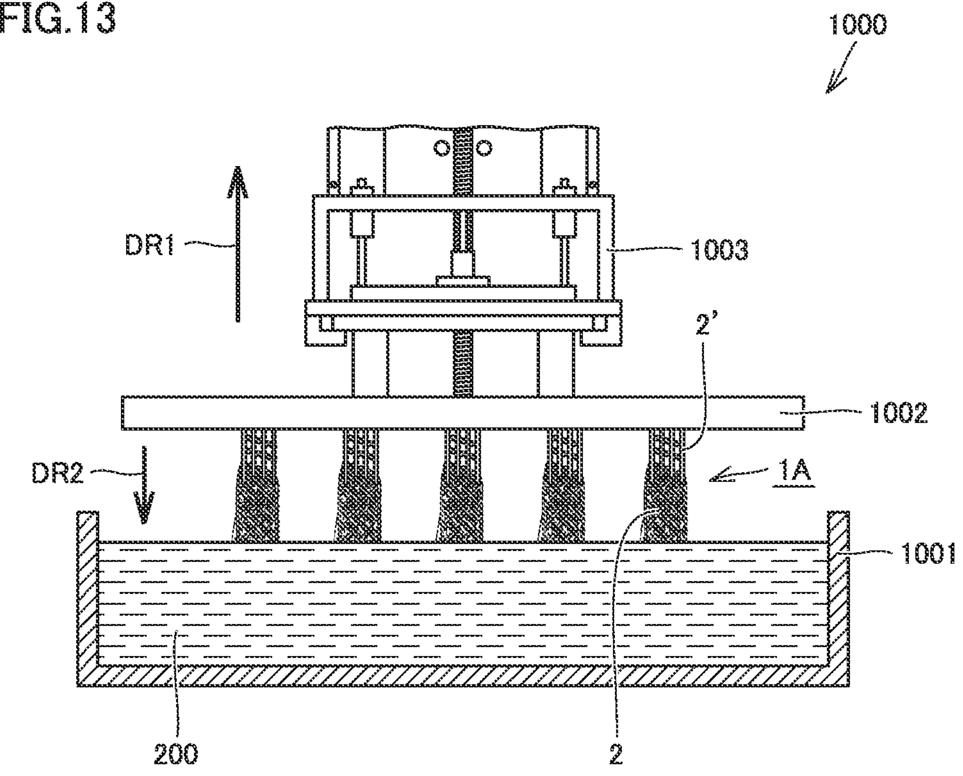
FIG. 13 is a schematic diagram showing a state in the middle of additive manufacturing of the sockliner by the three-dimensional additive manufacturing method in the method of manufacturing the sockliner according to the first embodiment.
Figure 14:
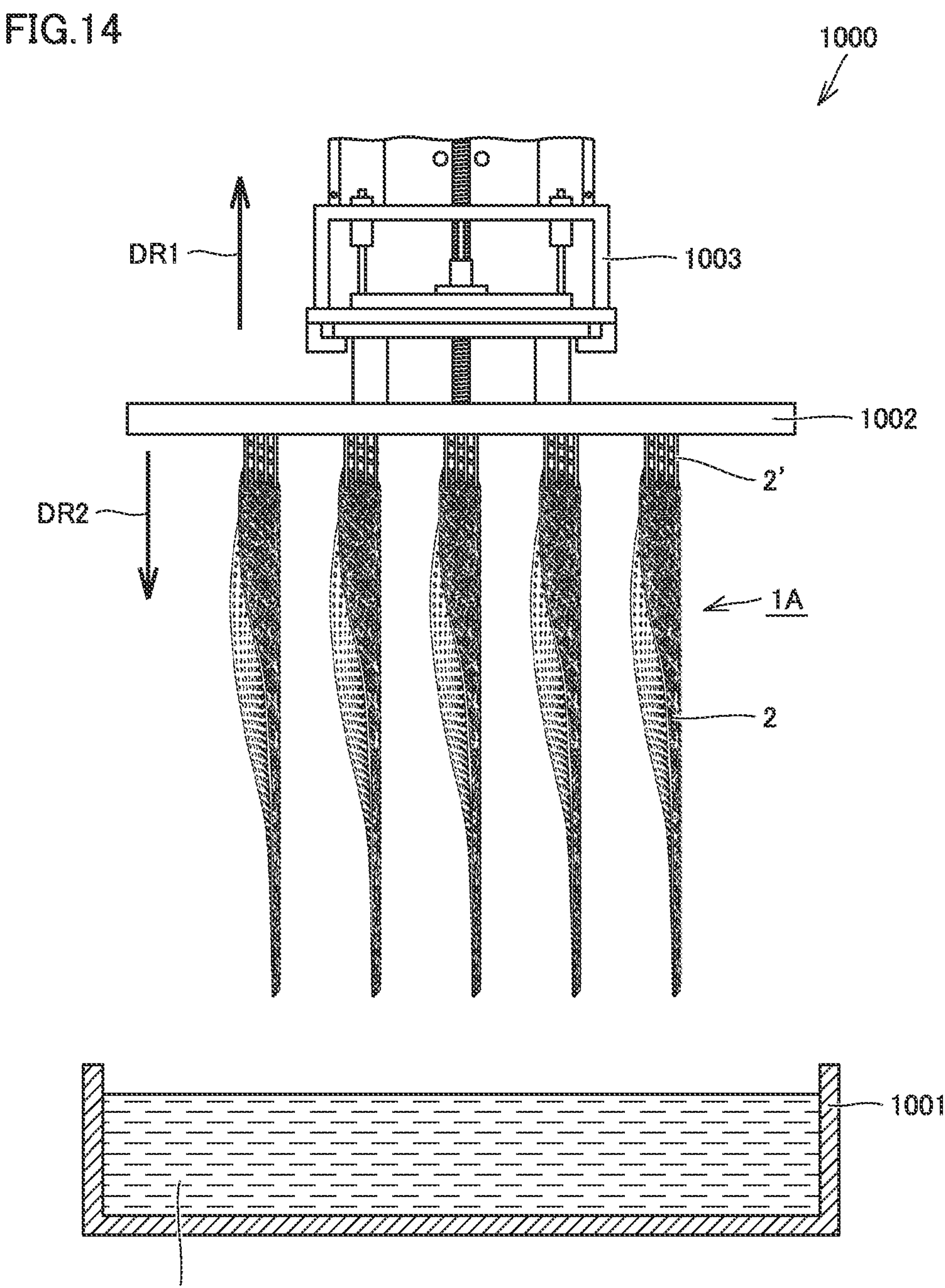
FIG. 14 is a schematic diagram showing a state at the end of additive manufacturing of the sockliner by the three-dimensional additive manufacturing method in the method of manufacturing the sockliner according to the first embodiment.

FIGS. 12, 13, and 14 are schematic diagrams showing the method of manufacturing the sockliner according to the first embodiment, and respectively illustrate the states of the start, middle, and end of additive manufacturing of the sockliner by the three-dimensional additive manufacturing method. The following describes the method of manufacturing the sockliner according to the present embodiment with reference to FIGS. 12 to 14.

As described above, the sockliner 1A according to the present embodiment is formed of the additively manufactured product 2 made of a single component produced by the vat polymerization three-dimensional additive manufacturing method. The sockliner 1A can be additively manufactured, for example, by using a three-dimensional additive manufacturing apparatus 1000 as shown in FIGS. 12 to 14.

The three-dimensional additive manufacturing apparatus 1000 serves to produce an additively manufactured product by the vat polymerization three-dimensional additive manufacturing method. In this case, according to the vat polymerization three-dimensional additive manufacturing method, a photocurable liquid resin or liquid rubber that is hardened by light of a specific wavelength is used as a main raw material, to which this light of a specific wavelength is applied to thereby sequentially stack hardened portions, and thus, an additively manufactured product having a desired shape is produced. Examples of the light of a specific wavelength used herein can be ultraviolet light, in which case an ultraviolet curing resin or rubber is used as a main raw material. Note that the above-mentioned liquid resin or liquid rubber as a main raw material is not limited to one-component type but can be two-component type or the like.

As shown in FIGS. 12 to 14, the three-dimensional additive manufacturing apparatus 1000 includes a light source (not shown), a storage tank 1001, a platform 1002, and a hoisting and lowering mechanism 1003. The storage tank 1001 serves to store a liquid resin 200 or the like as a raw material, and the platform 1002 serves to move the additively manufactured product 2 while holding it. The hoisting and lowering mechanism 1003 serves to move the platform 1002 upward and downward.

As shown in FIG. 12, in the three-dimensional additive manufacturing apparatus 1000, the platform 1002 is first moved by the hoisting and lowering mechanism 1003, and thereby, the lower surface of the platform 1002 is placed in contact with the liquid surface of the liquid resin 200 or the like. In this state, light of a specific wavelength emitted from the light source is applied to the vicinity of the liquid surface of the liquid resin 200 or the like in a prescribed pattern for exposure to light. Thereby, a portion of the liquid resin 200 or the like that is located in the vicinity of the liquid surface is hardened in a layered manner while adhering to the lower surface of the platform 1002, so that a first hardened layer is formed.

Then, the platform 1002 is moved upward (i.e., in the direction indicated by an arrow DR1 in the figure) by a prescribed amount by the hoisting and lowering mechanism 1003, to cause the lower surface of the first hardened layer to be placed in contact with the liquid surface of the liquid resin 200 or the like. In this state, light of a specific wavelength emitted from the light source is applied to the vicinity of the liquid surface of the liquid resin 200 or the like in a prescribed pattern for exposure to light. Thereby, a portion of the liquid resin 200 or the like that is located in the vicinity of the liquid surface is hardened in a layered manner while adhering to the lower surface of the first hardened layer, so that a second hardened layer is formed.

By repeating the same step as the step of forming the second hardened layer (i.e., the step of moving the platform 1002 and the step of exposing the liquid resin 200 or the like to light), a plurality of hardened layers are sequentially stacked in the downward direction (i.e., in the direction indicated by an arrow DR2 shown in the figure) as shown in FIG. 13, and thereby, additive manufacturing of the sockliner 1A proceeds. In this additive manufacturing process, the base layer portion 10 and the upper layer portion 20 each are sequentially additively manufactured simultaneously.

Then, as shown in FIG. 14, after all the portions of the sockliner 1A are additively manufactured, the platform 1002 is lifted further upward by the hoisting and lowering mechanism 1003. Then, the sockliner 1A is pulled away from the liquid resin 200 or the like stored in the storage tank 1001 and removed from the three-dimensional additive manufacturing apparatus 1000. At this time, the sockliner 1A that has been additively manufactured is not sufficiently hardened but is still relatively soft. Thus, the removed sockliner 1A is separately washed and heated, then substantially hardened, and further washed and dried, and thus, production of the sockliner 1A completes.

In this way, in the method of manufacturing the sockliner according to the present embodiment, the base layer portion 10 and the upper layer portion 20 each are simultaneously additively manufactured sequentially from the rear end area of the rearfoot portion R3 toward the front end area of the forefoot portion R1 by the vat polymerization three-dimensional additive manufacturing method. In other words, in the method of manufacturing the sockliner according to the present embodiment, the front-rear direction of the sockliner 1A coincides with the direction in which a plurality of hardened layers are sequentially stacked and the sockliner 1A is additively manufactured (i.e., in the direction indicated by the arrow DR2 shown in the figure).

When the sockliner 1A is manufactured according to the above-described manufacturing method, the footprint required for additively manufacturing the sockliner 1A on the platform 1002 becomes relatively small, and thereby, a plurality of sockliners 1A can be simultaneously additively manufactured as shown in the figure. Thus, manufacturing the sockliner 1A according to this manufacturing method can shorten the tact time and thereby can reduce the manufacturing cost, so that a method of manufacturing the sockliner 1A suitable for mass production can be implemented.

When the method of manufacturing the sockliner according to the present embodiment is adopted, due to the relation between the shape of the sockliner 1A to be additively manufactured and the posture (i.e., the direction) of the sockliner 1A during this additively manufacturing, a support portion 2' as shown in FIGS. 13 and 14 needs to be formed separately from the sockliner 1A so as to maintain the shape of the relatively soft sockliner 1A during additive manufacturing. The support portion 2' is cut away and removed from the sockliner 1A after additive manufacturing of the sockliner 1A.

Figure 15:
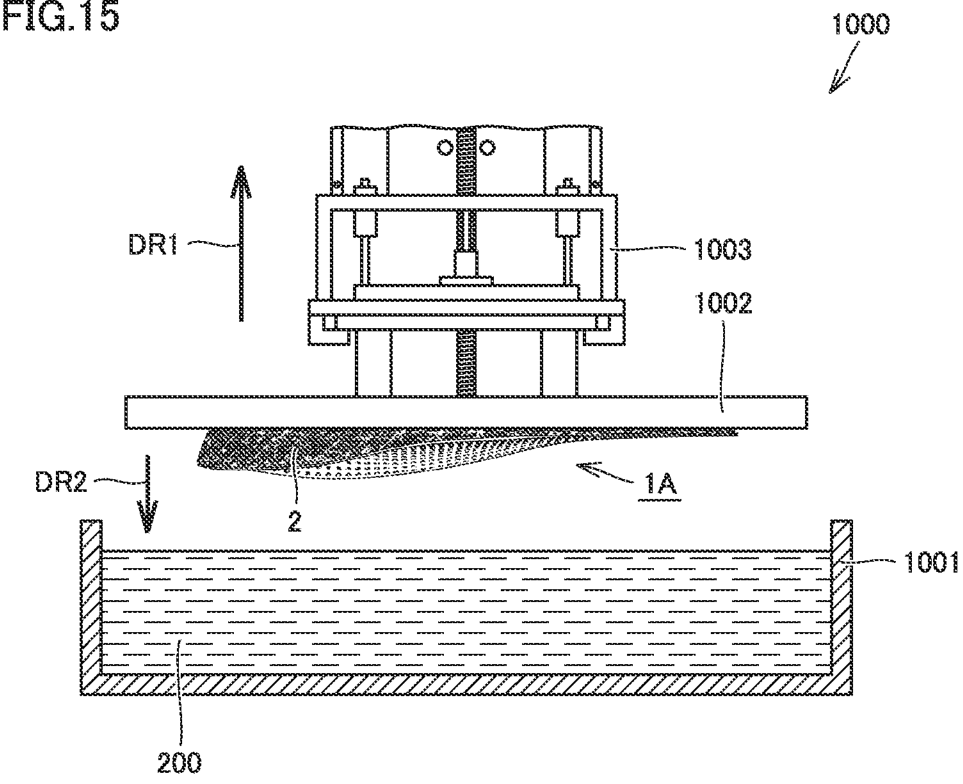
FIG. 15 is a schematic diagram showing another method of manufacturing the sockliner according to the first embodiment.

FIG. 15 is a schematic diagram showing another method of manufacturing the sockliner according to the first embodiment. Referring to FIG. 15, the following describes another method of manufacturing the sockliner according to the present embodiment.

As shown in FIG. 15, another method of manufacturing the sockliner according to the present embodiment is to manufacture the sockliner 1A (formed of a single component) using the three-dimensional additive manufacturing apparatus 1000 by the vat polymerization three-dimensional additive manufacturing method, similarly to the method of manufacturing the sockliner according to the above-described present embodiment (i.e., the method of manufacturing the sockliner as described with reference to FIGS. 12 to 14). However, another method of manufacturing the sockliner according to the present embodiment is different from the method of manufacturing the sockliner according to the present embodiment in terms of the direction in which the sockliner 1A is additively manufactured.

Specifically, in another method of manufacturing the sockliner according to the present embodiment, by employing a vat polymerization three-dimensional additive manufacturing method, a part of the base layer portion 10 is sequentially additively manufactured from the lower surface 12 side of the base layer portion 10 in the direction orthogonal to the lower surface 12 of the base layer portion 10, and subsequently, a remaining part of the base layer portion 10 and a part of the upper layer portion 20 are sequentially additively manufactured simultaneously, and further subsequently, a remaining part of the upper layer portion 20 is sequentially additively manufactured. In other words, in the method of manufacturing the sockliner according to the present embodiment, the up-down direction of the sockliner 1A coincides with the direction in which the plurality of hardened layers are sequentially stacked (in the direction indicated by the arrow DR2 shown in the figure).

When the sockliner 1A is manufactured according to the manufacturing method as described above, the footprint required to additively manufacture the sockliner 1A on the platform 1002 becomes relatively large, which makes it difficult to additively manufacture a plurality of sockliners 1A simultaneously. On the other hand, since the support portion 2' as shown in FIGS. 13 and 14 is no longer required, the tact time can be shortened in this respect, and the problem of producing waste materials (i.e., the support portion 2' having been cut away from the sockliner 1A) does not occur, so that the manufacturing cost can be reduced in this sense.

In this case, in each of the method of manufacturing the sockliner according to the present embodiment (i.e., the method of manufacturing the sockliner described with reference to FIGS. 12 to 14) and another method of manufacturing the sockliner according to the present embodiment (i.e., the method of manufacturing the sockliner described with reference to FIG. 15), the sockliner 1A is additively manufactured by a vat polymerization three-dimensional additive manufacturing method. During this additive manufacturing, the plurality of holes 24 as described above are provided in the upper layer portion 20 of the sockliner 1A.

As described above, most of the plurality of holes 24 are in communication with the holes provided on the inside of and in the outer surface of the base layer portion 10 along the boundary surface between the upper layer portion 20 and the base layer portion 10. Thus, the plurality of holes 24 serve as discharge holes through which unhardened liquid resin remaining inside the base layer portion 10 is discharged during the above-mentioned washing process. Therefore, during the heating process performed after the washing process, remaining of the unhardened liquid resin inside the base layer portion 10 can be suppressed, so that shape defects are less likely to occur, with the result that the sockliner 1A having an intended shape can be manufactured.

As described above, employing the sockliner 1A according to the present embodiment and the method of manufacturing the same makes it possible to provide a sockliner achieving high performance, an excellent feel of contact for a foot, and excellent durability, and a method of manufacturing the sockliner.

<First and Second Modifications>

Figure 16:
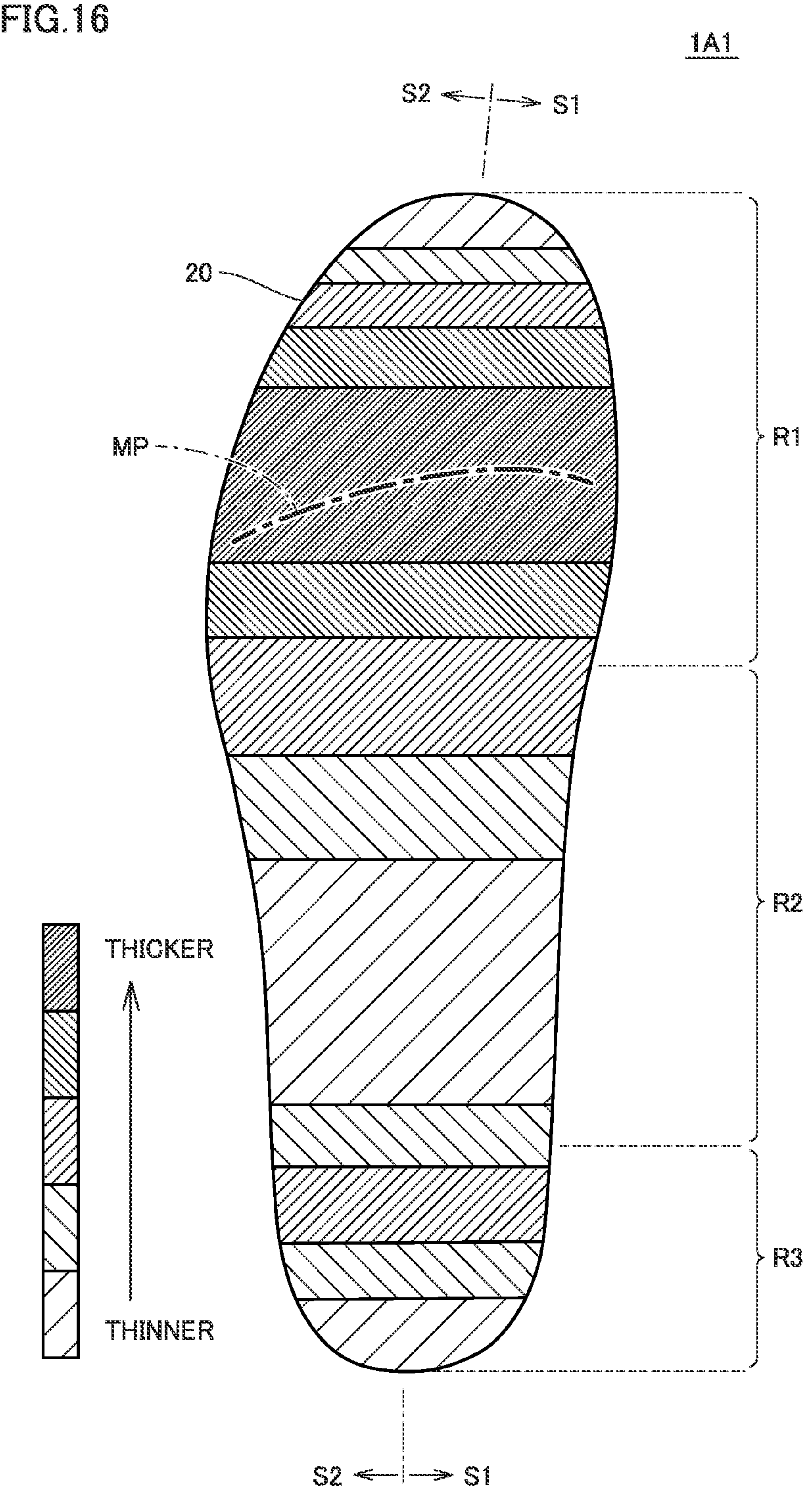
FIG. 16 is a schematic diagram showing a thickness distribution of an upper layer portion of a sockliner according to a first modification.
Figure 17:
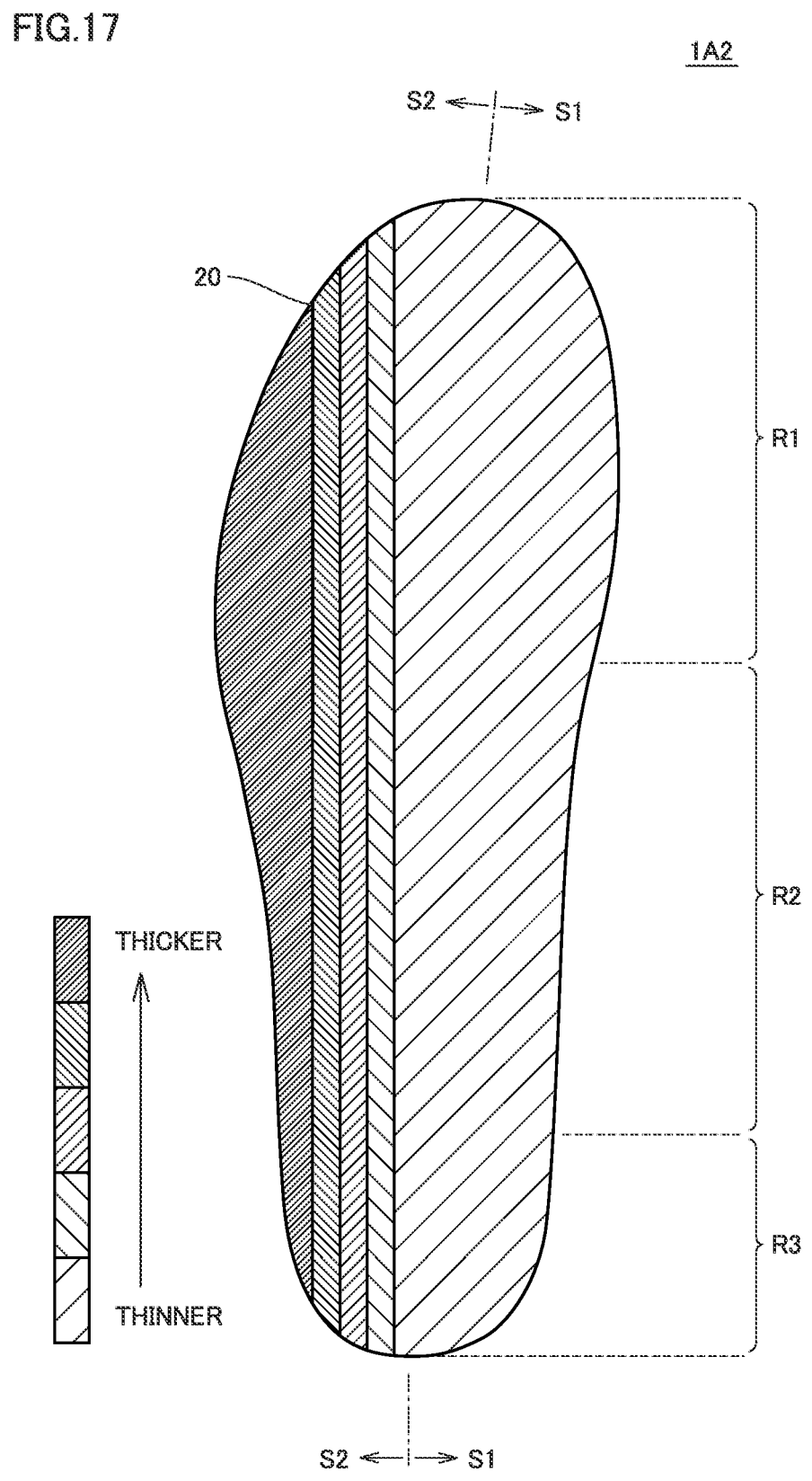

FIGS. 16 and 17 are schematic diagrams each showing the thickness distribution of an upper layer portion of a sockliner according to each of the first and second modifications. Referring to FIGS. 16 and 17, the following describes sockliners 1A1 and 1A2 according to the first and second modifications based on the above-described first embodiment.

As shown in FIGS. 16 and 17, the sockliners 1A1 and 1A2 according to the first and second modifications are different in configuration from the sockliner 1A according to the first embodiment only in that the upper layer portion 20 is different in thickness distribution.

Specifically, in the sockliner A1 according to the first modification shown in FIG. 16, the upper layer portion 20 is not only configured to be thicker in a substantially central region in the front-rear direction of the forefoot portion R1 that includes a portion supporting a part of the foot sole corresponding to the MP joint of the user (a portion indicated by a symbol MP in the figure) than in a region adjacent to the substantially central region, but is also configured to be thicker in the rearfoot portion R3 than in a portion adjacent to the rearfoot portion R3 The rearfoot portion R3 serves to support the heel portion of the user as described above.

Therefore, the configuration as described above can enhance the durability of the portion included in the sockliner 1A that receives relatively high foot pressure during landing on the ground and for supporting the heel portion and the part of the foot sole corresponding to the MP joint of the user, and also can effectively disperse the foot pressure, so that high shock absorbing performance can be achieved.

On the other hand, in the sockliner 1A2 according to the second modification shown in FIG. 17, the upper layer portion 20 is configured to be thicker in the portion that supports the part on the lateral foot side in the foot sole of the user than in the portion that supports the part on the medial foot side in the foot sole of the user.

In the configuration as described above, the sockliner 1A is more rigid in the portion on the lateral foot side than in the portion on the medial foot side, which makes it possible to effectively suppress the collapse of the heel portion (which is called pronation) occurring when the user's foot lands on the ground, so that the support performance can be enhanced.

In addition to the above, the thickness distribution of the upper layer portion 20 in the sockliner can be changed as appropriate, and can be optimized in accordance with the performance required for the sockliner. In this case, the performance required for the sockliner differs depending on the scene in which the footwear equipped with the sockliner is used (daily walking, training, sports competition, and the like). For example, in the scene of sports, the performance required for the sockliner is the performance required depending on various actions (for example, a push-off action, a turn-back action, lateral moving action, and the like) required depending on the specific type of sports. Although not specifically described herein, the thickness distribution of the base layer portion 10 can also be changed as appropriate and can be optimized in accordance with the performance required for the sockliner.

<Third Modification>

Figures 18A, 18B, 18C:
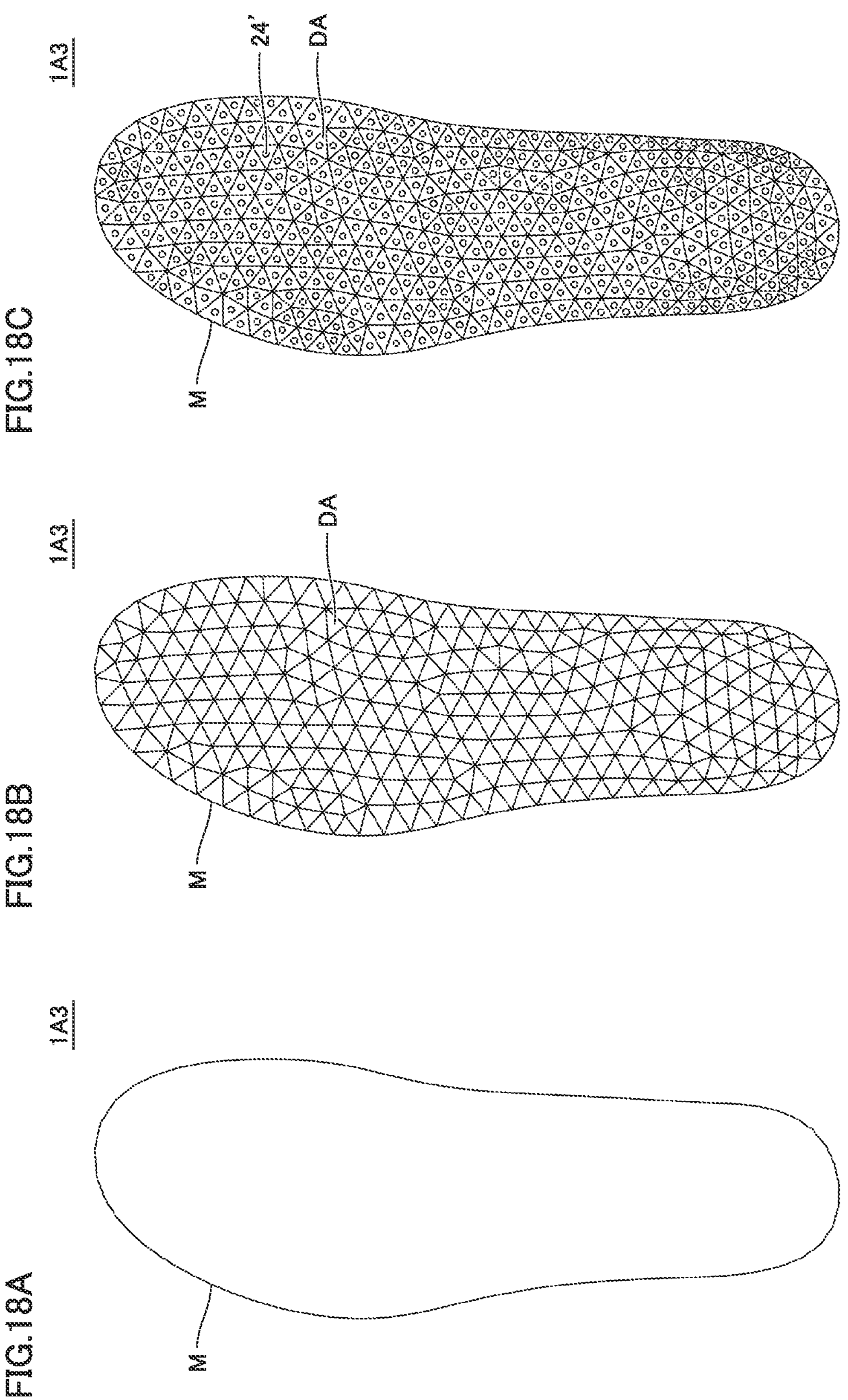
FIGS. 18A to 18C are schematic diagrams each illustrating a mapping method for a plurality of holes provided in an upper layer portion of a sockliner according to a third modification.

FIGS. 18A to 18C are schematic diagrams each showing a mapping method for a plurality of holes provided in an upper layer portion of a sockliner according to the third modification. Referring to FIGS. 18A to 18C, the following describes an example of another mapping method different from the mapping method for the plurality of holes 24 provided in the upper layer portion 20 that has been described above in the first embodiment.

As shown in FIG. 18A, also in the mapping method according to the present modification, first, a sockliner model M is generated based on the shape data about the user's foot sole that is obtained by the imaging means or the like.

Then, as shown in FIG. 18B, the upper surface of the generated sockliner model M is divided into regions. At this time, in the mapping method according to the present modification, the upper surface of the sockliner model M is divided into a plurality of triangular divided regions DA adjacent to each other. Thus, the upper surface of the sockliner model M is paved with a large number of triangular divided regions DA.

Then, as shown in FIG. 18C, a circular or elliptical drawn line 24' having a prescribed size is plotted at a central position in each of the plurality of triangular divided regions DA. This drawn line 24' corresponds to the outline of each of the plurality of holes 24 provided in the upper layer portion 20, and thus, mapping of the plurality of holes 24 provided in the upper layer portion 20 is completed.

Adopting such a mapping method also makes it possible to easily manufacture a sockliner 1A3 in which the plurality of holes 24 included in the through-hole group are arranged substantially uniformly in the entire area of the upper layer portion 20 when viewed in the thickness direction of the upper layer portion 20, as in the above-described first embodiment.

<Fourth Modification>

Figure 19:
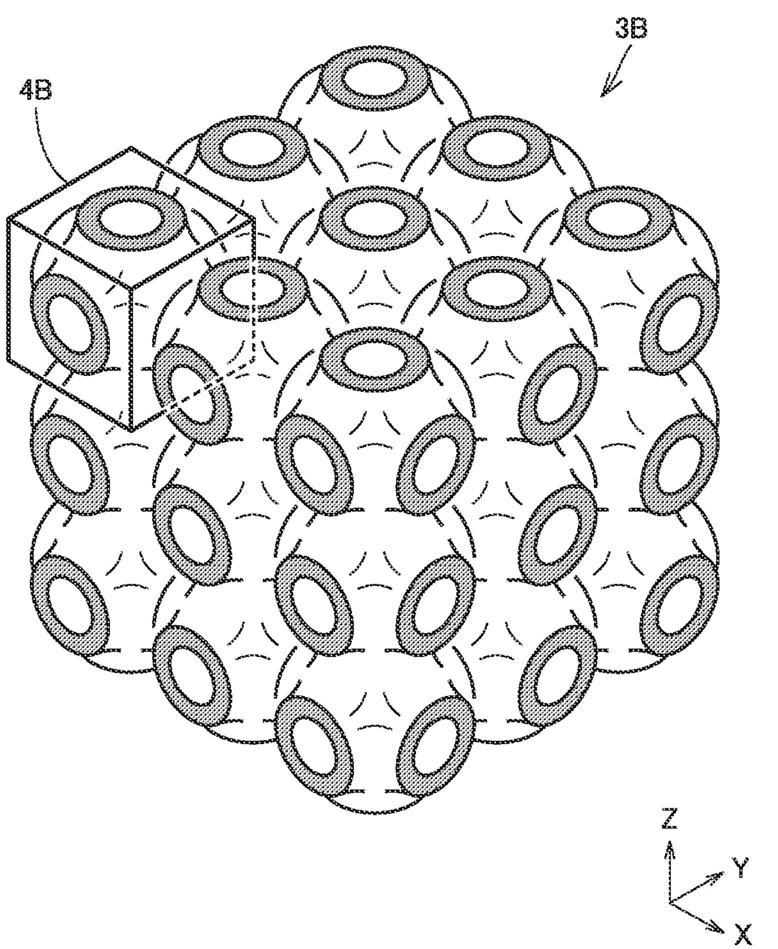
FIG. 19 is a schematic diagram for illustrating a three-dimensional structure of a base layer portion of a sockliner according to a fourth modification.

FIG. 19 is a schematic diagram for illustrating a three-dimensional structure of a base layer portion in a sockliner according to the fourth modification. Referring to FIG. 19, the following describes a sockliner 1A4 according to the fourth modification based on the above-described first embodiment.

The sockliner 1A4 according to the fourth modification is different in configuration from the sockliner 1A according to the first embodiment only in that the base layer portion 10 is different in three-dimensional structure.

Specifically, as shown in FIG. 19, the base layer portion 10 of the sockliner 1A4 according to the fourth modification is formed of a three-dimensional mesh structure body 3B in which a plurality of unit structures 4B each having a three-dimensional wall structure are repeatedly arranged. More specifically, the plurality of unit structures 4B are repeatedly arranged in a regular and continuous manner in each of the width direction (the X direction shown in the figure), the depth direction (the Y direction shown in the figure), and the height direction (the Z direction shown in the figure). In FIG. 19, only three unit structures 4B adjacent to each other in the width direction, the depth direction, and the height direction are selectively shown, in which each cut-away surface is shown in a dark color.

The unit structure 4B having a three-dimensional wall structure has a three-dimensional shape formed by a wall having an outer shape defined by a pair of parallel curved surfaces. In this case, the unit structure 4B shown in the figure is obtained by adding a thickness to a Schwartz P structure, which is a type of mathematically defined triply periodic minimal surface, as a base structure. Note that a minimal surface is defined as a curved surface that is minimal in area among the curved surfaces having a given closed curve as a boundary.

The base layer portion 10 configured as described above is disposed in the lower portion of the sockliner 1A4 to thereby allow the sockliner 1A4 to have high deformability, which makes it possible to obtain a sockliner achieving excellent wearing comfort with excellent shock absorbing performance and also enhanced in stability during wearing of the shoe. Further, the base layer portion 10 having the above-described configuration makes it possible to obtain a sockliner that is lightweight considering the size of the sockliner and also excellent in air permeability.

Additional applicable examples of the unit structure 4B having a three-dimensional wall structure can be a structure obtained by adding a thickness to a triply periodic minimal surface such as a gyroid structure or a Schwartz D structure as a base structure. Further, applicable examples of the unit structure 4B having a three-dimensional wall structure can be a structure having a three-dimensional shape formed by a wall having an outer shape defined by a pair of parallel flat surfaces. Specific examples in this case can be a structure obtained by adding a thickness to an octet structure, a cubic structure, or the like.

Second Embodiment

Figure 20:
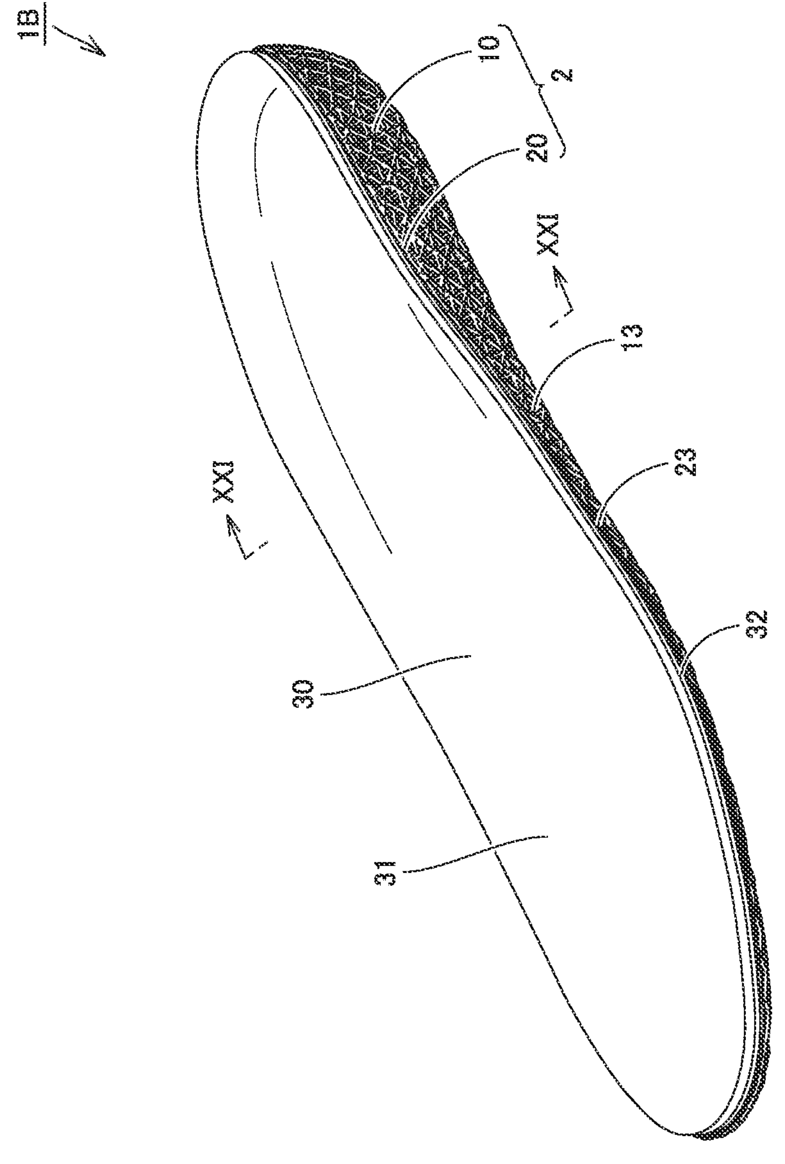
FIG. 20 is a perspective view of a sockliner according to a second embodiment as viewed from the obliquely upper right front side.
Figure 21:
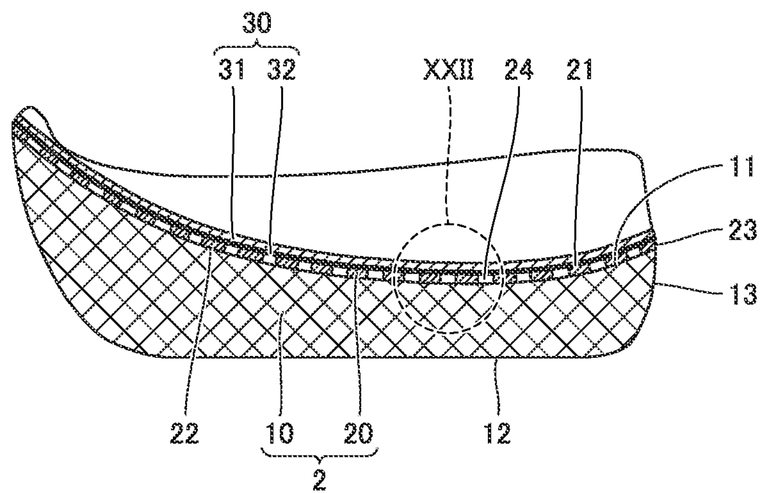
FIG. 21 is a schematic cross-sectional view of the sockliner shown in FIG. 20 taken along a line XXI-XXI shown in FIG. 20.
Figure 22:
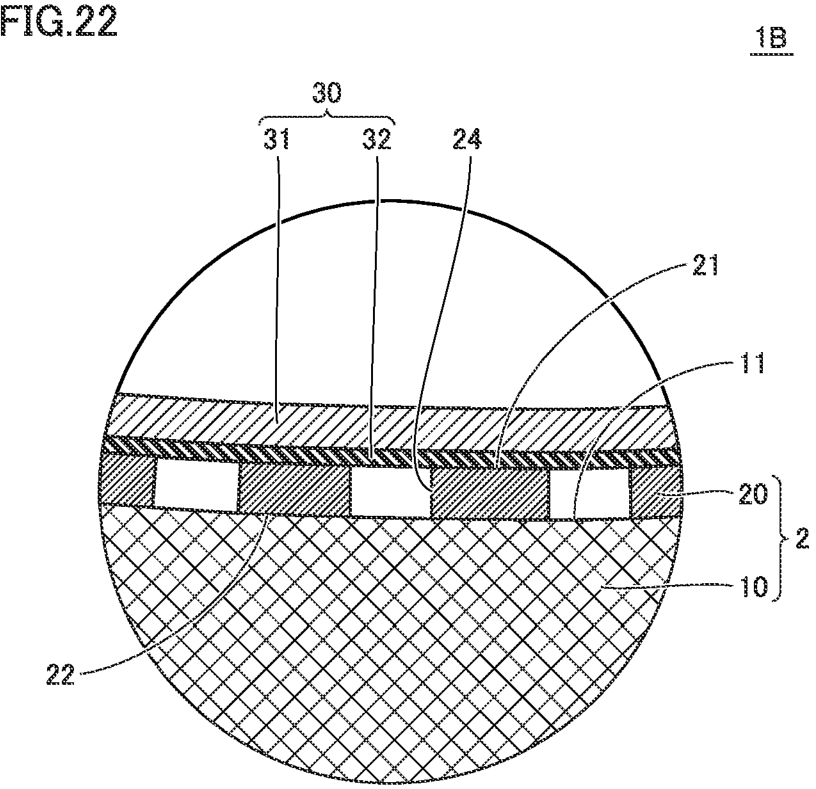
FIG. 22 is an enlarged view of a region XXII shown in FIG. 21.
Figure 23:
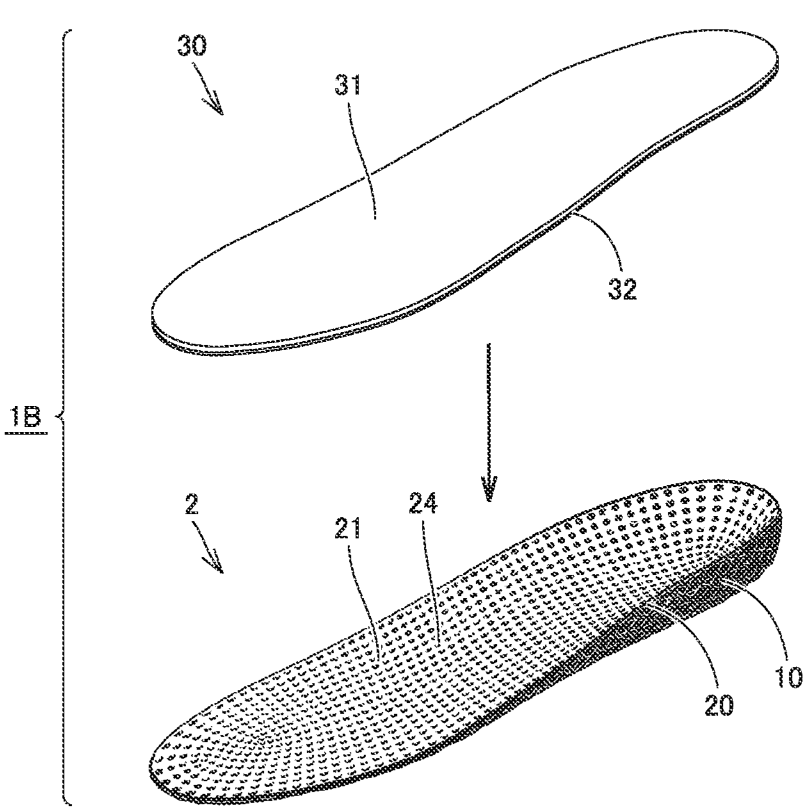
FIG. 23 is an exploded perspective view of the sockliner shown in FIG. 20.

FIG. 20 is a perspective view of a sockliner according to the second embodiment as viewed from the obliquely upper right front side. FIG. 21 is a schematic cross-sectional view of the sockliner shown in FIG. 20 taken along a line XXI-XXI shown in FIG. 20, and FIG. 22 is an enlarged view of a region XXII shown in FIG. 21. FIG. 23 is an exploded perspective view of the sockliner shown in FIG. 20. Referring to FIGS. 20 to 23, a sockliner 1B according to the present embodiment will be hereinafter described. The sockliner 1B according to the present embodiment is dispose on the shoe 100 for use in place of the sockliner 1A according to the first embodiment.

As shown in FIGS. 20 and 21, the sockliner 1B includes a base layer portion 10, an upper layer portion 20, and a liner 30. The base layer portion 10 and the upper layer portion 20 are formed of a single component similarly to the sockliner 1A according to the above-described first embodiment, and are formed of an additively manufactured product 2 produced by a vat polymerization three-dimensional additive manufacturing method. The liner 30 is fixed to the additively manufactured product 2 formed of a single component.

The liner 30 includes: a base fabric portion 31 made of a woven fabric or a nonwoven fabric; and a sticky adhesive layer 32 provided on a lower surface of the base fabric portion 31. In this case, as shown in FIG. 23, the sticky adhesive layer 32 is affixed to the upper surface 21 of the upper layer portion 20 and thereby the liner 30 is fixed to the upper layer portion 20. Thus, the liner 30 covers the upper surface 21 of the upper layer portion 20, and accordingly, also covers a through-hole group including a plurality of holes 24 provided in the upper layer portion 20 (particularly see FIGS. 21 and 22).

Thereby, the upper surface of the sockliner 1B that comes into contact with the foot sole of the user wearing a shoe is configured of the base fabric portion 31 of the liner 30. Since the base fabric portion 31 is more flexible than the upper layer portion 20, the base fabric portion 31 configured as described above can contribute to a sockliner that achieves a more excellent feel of contact for a foot and more excellent wearing comfort than those achieved by the sockliner 1A according to the first embodiment. Since the base fabric portion 31 made of a woven fabric or a nonwoven fabric has a surface slipping more easily than the upper layer portion 20, the base fabric portion 31 configured as described above allows the user's foot to be smoothly inserted into the shoe 100 when the user wears the shoe 100.

In this case, the sticky adhesive layer 32 is preferably made of glue that is applied in advance onto the lower surface of the base fabric portion 31. This can prevent in advance the sticky adhesive layer 32 from entering and blocking the holes 24 provided in the upper layer portion 20, so that a decrease in air permeability can be suppressed. Further, when the sticky adhesive layer 32 is provided not entirely but partially on the lower surface of the base fabric portion 31, some of the plurality of holes 24 provided in the upper layer portion 20 can be prevented from being covered by the sticky adhesive layer 32 while the base fabric portion 31 is fixed to the upper layer portion 20, with the result that air permeability can be more reliably ensured.

In this regard, when the base fabric portion 31 is fixed with an adhesive agent to the upper layer portion 20, the adhesive agent may enter the holes 24 provided in the upper layer portion 20, which may decrease the air permeability. However, if an adhesive agent is applied not entirely but partially onto the lower surface of the base fabric portion 31, the adhesive agent can be prevented from entering some of the plurality of holes 24 provided in the upper layer portion 20 while the base fabric portion 31 is fixed to the upper layer portion 20. Thereby, a decrease in air permeability can be suppressed to a considerable degree.

The material of the base fabric portion 31 is not particularly limited, and specific examples thereof include: synthetic fibers such as polyester fibers or nylon fibers excellent in air permeability, heat dissipation, wear resistance and the like, and natural fibers such as cotton excellent in air permeability, moisture absorbing performance, and the like. The thickness of the base fabric portion 31 is not particularly limited, but the base fabric portion 31 is preferably less in thickness than the upper layer portion 20 in order to reduce the friction and improve the texture between the foot sole and the base fabric portion 31. For example, the thickness of the base fabric portion 31 is preferably 0.1 mm or more and 2.0 mm or less, and is about 1.0 mm by way of example.

The material of the sticky adhesive layer 32 is not particularly limited, and suitably applicable examples thereof include a material containing an acrylic resin, a urethane resin, a silicone resin, rubber, or the like as a main component. The thickness of the sticky adhesive layer 32 is not particularly limited but is, for example, preferably 0.01 mm or more and 0.5 mm or less, and is about 0.1 mm by way of example.

The sockliner 1B configured as described above can also achieve high performance, an excellent feel of contact for a foot, and excellent durability as with the sockliner 1A according to the first embodiment.

Summary of the Disclosure in Embodiments

The following summarizes the characteristic points disclosed in the above-described first and second embodiments and modifications thereof

[Supplementary Note 1]

A sockliner includes: a forefoot portion that supports a toe portion and a ball portion of a foot of a user; a midfoot portion that supports an arch portion of the foot of the user; and a rearfoot portion that supports a heel portion of the foot of the user, the sockliner being dispose on an inner bottom surface of footwear for use, the sockliner including:

a base layer portion disposed with a lower surface facing the inner bottom surface of the footwear; and an upper layer portion configured to cover an upper surface of the base layer portion, wherein the base layer portion comprises a three-dimensional mesh structure body in which a unit structure is repeatedly arranged in multiple arrays, the unit structure having at least one of a three-dimensional lattice structure and a three-dimensional wall structure, the upper layer portion is formed of a sheet-like structure body comprising a through-hole group including a plurality of holes penetrating through the upper layer portion in a thickness direction of the upper layer portion, each of the holes included in the through-hole group is located inward from a peripheral edge of the upper layer portion without reaching the peripheral edge of the upper layer portion, and in a case where a surrounding region is defined as a region between the peripheral edge of the upper layer portion and a position offset by 4.0 mm inward from the peripheral edge of the upper layer portion, the through-hole group includes an outermost hole group including a plurality of holes located closest to the peripheral edge of the upper layer portion so as to overlap with the surrounding region and to align along the peripheral edge of the upper layer portion.

[Supplementary Note 2]

In the sockliner according to Supplementary Note 1, the holes included in the through-hole group are arranged substantially uniformly in an entire area of the upper layer portion when viewed in a thickness direction of the upper layer portion.

[Supplementary Note 3]

In the sockliner according to Supplementary Note 1 or 2. when viewed in the thickness direction of the upper layer portion, among the holes included in the through-hole group, holes located in a region on a front end area of the forefoot portion are arranged substantially radially in dotted lines, holes located in a region on a rear end area of the rearfoot portion are arranged substantially radially in dotted lines, holes located in a region on a rear end area of the forefoot portion are arranged substantially in a matrix in dotted lines, holes located in the midfoot portion are arranged substantially in a matrix in dotted lines, and holes located in a region on a front end area of the rearfoot portion are arranged substantially in a matrix in dotted lines.

[Supplementary Note 4]

In the sockliner according to any one of Supplementary Notes 1 to 3, the holes included in the through-hole group are formed to be substantially larger in opening area toward the peripheral edge of the upper layer portion when viewed in the thickness direction of the upper layer portion.

[Supplementary Note 5]

In the sockliner according to any one of Supplementary Notes 1 to 4, the holes included in the through-hole group have a cylindrical shape or an elliptic cylindrical shape.

[Supplementary Note 6]

In the sockliner according to any one of Supplementary Notes 1 to 5, in a case where a surface area of an upper surface of the upper layer portion is defined as Sa and a total opening area of the holes included in the through-hole group on the upper surface of the upper layer portion is defined as Sb, a condition of $0.15 \leq Sb/(Sa+Sb) \leq 0.70$ is satisfied.

[Supplementary Note 7]

In the sockliner according to any one of Supplementary Notes 1 to 6, an occupied volume ratio of the base layer portion is 5% or more and 50% or less.

[Supplementary Note 8]

In the sockliner according to any one of Supplementary Notes 1 to 7, the upper layer portion is not uniform in thickness.

[Supplementary Note 9]

In the sockliner according to Supplementary Note 8, in the upper layer portion, a portion that supports a part of a foot sole corresponding to an MP joint of the user is thicker than a portion adjacent to the portion.

[Supplementary Note 10]

In the sockliner according to Supplementary Note 8 or 9, in the upper layer portion, a portion included in the rearfoot portion is thicker than a portion adjacent to the portion.

[Supplementary Note 11]

In the sockliner according to any one of Supplementary Notes 8 to 10, in the upper layer portion, a portion that supports a part on a lateral foot side of a foot sole of the user is thicker than a portion that supports a part on a medial foot side of the foot sole of the user.

[Supplementary Note 12]

In the sockliner according to any one of Supplementary Notes 1 to 11, the base layer portion and the upper layer portion are formed of a single component.

[Supplementary Note 13]

In the sockliner according to Supplementary Note 12, the base layer portion and the upper layer portion that are formed of a single component are formed of a single additively manufactured product produced by a vat polymerization three-dimensional additive manufacturing method.

[Supplementary Note 14]

The sockliner according to any one of Supplementary Notes 1 to 13 further includes a liner that covers an upper surface of the upper layer portion, wherein the liner is formed of a woven fabric or a nonwoven fabric.

[Supplementary Note 15]

In the sockliner according to Supplementary Note 14, the liner includes a sticky adhesive layer disposed on a main surface located on a side of the upper layer portion, and the liner is fixed to the upper layer portion by affixing the liner onto the upper surface of the upper layer portion with the sticky adhesive layer interposed therebetween.

[Supplementary Note 16]

A method of manufacturing the sockliner according to Supplementary Note 13 includes:

producing the base layer portion; and producing the upper layer portion, wherein in the producing of the base layer portion and the producing of the upper layer portion, by a vat polymerization three-dimensional additive manufacturing method, the base layer portion and the upper layer portion are simultaneously and sequentially accumulated from a rear end area of the rearfoot portion to a front end area of the forefoot portion by additive manufacturing.

[Supplementary Note 17]

A method of manufacturing the sockliner according to Supplementary Note 13 includes:

producing the base layer portion; and producing the upper layer portion, wherein in the producing of the base layer portion and the producing of the upper layer portion, by a vat polymerization three-dimensional additive manufacturing method, at least a part of the base layer portion is simultaneously and sequentially accumulated from a side of the lower surface of the base layer portion in a direction orthogonal to the lower surface of the base layer portion, and subsequently, at least a part of the upper layer portion is simultaneously and sequentially accumulated by additive manufacturing.

Other Embodiments

The first and second embodiments and the modifications thereof have been described above with reference to an example in which the base layer portion 10 and the upper layer portion 20 that are formed of a single component are produced by a vat polymerization three-dimensional additive manufacturing method, but the base layer portion 10 and the upper layer portion 20 can also naturally be produced by other type of three-dimensional additive manufacturing method. Further, the base layer portion 10 and the upper layer portion 20 do not necessarily have to be formed of a single component, but can be separately produced and then joined to each other. In this case, the base layer portion 10 is preferably produced by a three-dimensional additive manufacturing method in terms of its structure, but the upper layer portion 20 does not necessarily have to be produced by a three-dimensional additive manufacturing method in terms of its structure, and can be produced by various methods such as injection molding or sheet molding.

Further, the first and second embodiments and the modifications thereof have been described above with reference to an example in which the plurality of holes 24 included in the through-hole group are provided substantially uniformly in the entire area of the upper layer portion 20, but the plurality of holes 24 do not necessarily have to be substantially uniformly provided and can be positioned unevenly in some regions on the upper layer portion 20. For example, a plurality of holes 24 can be provided in the forefoot portion R1 and the rearfoot portion R3 but cannot be provided in the midfoot portion R2. Also in this case, however, the through-hole group including the plurality of holes 24 provided in the forefoot portion R1 and the rearfoot portion R3 needs to include the outermost hole group including the plurality of holes 24*a* overlapping with the surrounding region A1 and arranged along the peripheral edge of the upper layer portion 20. Further, all of the plurality of holes 24 included in the through-hole group provided in the upper layer portion 20 can be provided in the outermost hole group that includes the plurality of holes 24*a* overlapping with the surrounding region A1 and arranged along the peripheral edge of the upper layer portion 20 (i.e., holes 24 overlapping with only the inner region A2 are not provided).

Further, when additively manufacturing the base layer portion 10 exemplified in the above-described first and second embodiments and modifications thereof, the outer surface of the base layer portion 10 can be provided with symbol portions or design portions such as characters, logos, patterns, and authentication codes as options by additive manufacturing. In this case, however, in order to prevent these symbol portions and design portions from adversely affecting the feel of contact for a foot and the shock absorbing performance, these symbol portions and design portions are preferably provided on the peripheral surface 13 of the base layer portion 10, or provided on a relatively thick portion of the base layer portion 10 or a portion of the base layer portion 10 that corresponds to a relatively thick portion of the upper layer portion 20 (for example, a portion close to the rear end of the forefoot portion R1, a portion close to the front end of the midfoot portion R2, a portion extending from the rear end of the midfoot portion R2 to the front end of the rearfoot portion R3, and the like).

In addition, the second embodiment has been described above with reference to an example configuration in which the liner 30 is affixed onto the upper layer portion 20 with the sticky adhesive layer 32 provided on the liner 30, but the base fabric portion 31 can be fixed to the upper layer portion 20 by other methods typified, for example, by bonding through application of an adhesive agent.

Further, the characteristic configurations disclosed in the aforementioned embodiments and modifications thereof can be combined with each other without departing from the gist of the present disclosure.

Although the embodiments of the present disclosure have been described, it should be understood that the embodiments disclosed herein are illustrative and not restrictive in all respects. The scope of the present disclosure is defined by the terms of the claims and is intended to include any modifications within the meaning and scope equivalent to the terms of the claims.

What is claimed is:

1. A sockliner including a forefoot portion configured to support a toe portion and a ball portion of a foot of a user, a midfoot portion configured to support an arch portion of the foot of the user, and a rearfoot portion configured to support a heel portion of the foot of the user, the sockliner being configured for placement on an inner bottom surface of footwear for use, the sockliner comprising:

a base layer portion having a lower surface configured to face the inner bottom surface of the footwear; and an upper layer portion covering an upper surface of the base layer portion, wherein the base layer portion comprises a three-dimensional mesh structure body in which a unit structure is repeatedly arranged in multiple arrays, the unit structure having at least one of a three-dimensional lattice structure and a three-dimensional wall structure, the upper layer portion has a sheet structure body comprising a through-hole group including a first plurality of holes penetrating through the upper layer portion in a thickness direction of the upper layer portion, each of the first plurality of holes included in the through-hole group is inward from a peripheral edge of the upper layer portion without reaching the peripheral edge of the upper layer portion, the first plurality of holes is arranged substantially radially in a first plurality of dotted lines at the forefoot portion with respect to a substantially central position of the forefoot portion as a base point for the first plurality of dotted lines, and/or substantially radially in a second plurality of dotted lines at the rearfoot portion with respect to a substantially central position of the rearfoot portion as a base point for the second plurality of dotted lines, a surrounding region is defined as a region between the peripheral edge of the upper layer portion and a position offset by 4.0 mm inward from the peripheral edge of the upper layer portion, the through-hole group includes an outermost hole group including a second plurality of holes penetrating through the upper layer portion in the thickness direction of the upper layer portion and located closer to the peripheral edge of the upper layer portion than the first plurality of holes, to overlap with the surrounding region and to align along the peripheral edge of the upper layer portion without reaching the peripheral edge of the upper layer portion, and the upper surface of the base layer portion is provided with protrusions and recesses due to the presence of a third plurality of holes on an inside of and in an outer surface of the base layer portion.

2. The sockliner according to claim 1, wherein each of the first and the second plurality of holes included in the through-hole group is arranged substantially uniformly on an entirety of an upper surface of the upper layer portion when viewed in a thickness direction of the upper layer portion.

3. A sockliner including a forefoot portion configured to support a toe portion and a ball portion of a foot of a user, a midfoot portion configured to support an arch portion of the foot of the user, and a rearfoot portion configured to support a heel portion of the foot of the user, the sockliner being configured for placement on an inner bottom surface of footwear for use, the sockliner comprising:

a base layer portion having a lower surface configured to face the inner bottom surface of the footwear; and an upper layer portion covering an upper surface of the base layer portion, wherein the base layer portion comprises a three-dimensional mesh structure body in which a unit structure is repeatedly arranged in multiple arrays, the unit structure having at least one of a three-dimensional lattice structure and a three-dimensional wall structure, the upper layer portion has a sheet structure body comprising a through-hole group including a first plurality of holes penetrating through the upper layer portion in a thickness direction of the upper layer portion, each of the first plurality of holes included in the through-hole group is inward from a peripheral edge of the upper layer portion without reaching the peripheral edge of the upper layer portion, the first plurality of holes is arranged in a substantially radial pattern at the forefoot portion with respect to a substantially central position of the forefoot portion, and in a substantially radial pattern at the rearfoot portion with respect to a substantially central position of the rearfoot portion, a surrounding region is defined as a region between the peripheral edge of the upper layer portion and a position offset by 4.0 mm inward from the peripheral edge of the upper layer portion, the through-hole group includes an outermost hole group including a second plurality of holes penetrating through the upper layer portion in the thickness direction of the upper layer portion and located closer to the peripheral edge of the upper layer portion than the first plurality of holes, to overlap with the surrounding region and to align along the peripheral edge of the upper layer portion without reaching the peripheral edge of the upper layer portion, and when viewed in the thickness direction of the upper layer portion, among the first and the second plurality of holes included in the through-hole group, the first and the second plurality of holes in a region on a front end area of the forefoot portion are arranged substantially radially in dotted lines, the first and the second plurality of holes in a region on a rear end area of the rearfoot portion are arranged substantially radially in dotted lines, the first and the second plurality of holes in a region on a rear end area of the forefoot portion are arranged substantially in a matrix in dotted lines, the first and the second plurality of holes in the midfoot portion are arranged substantially in a matrix in dotted lines, the first and the second plurality of holes in a region on a front end area of the rearfoot portion are arranged substantially in a matrix in dotted lines, and the upper surface of the base layer portion is provided with protrusions and recesses due to the presence of a third plurality of holes on an inside of and in an outer surface of the base layer portion.

4. The sockliner according to claim 1, wherein the second plurality of holes included in the through-hole group are each substantially larger in opening area than the first plurality of holes when viewed in the thickness direction of the upper layer portion.

5. The sockliner according to claim 1, wherein the first and the second plurality of holes included in the through-hole group each have a cylindrical shape or an elliptic cylindrical shape.

6. The sockliner according to claim 1, wherein a surface area of an upper surface of the upper layer portion is defined as Sa, a total opening area of the first and the second plurality of holes included in the through-hole group on the upper surface of the upper layer portion is defined as Sb, and a condition of $0.15 \leq Sb/(Sa+Sb) \leq 0.70$ is satisfied.

7. The sockliner according to claim 1, wherein an occupied volume ratio of the base layer portion is from 5% to 50%.

8. The sockliner according to claim 1, wherein the upper layer portion is not uniform in thickness.

9. The sockliner according to claim 8, wherein in the upper layer portion, a first portion that is configured to support a part of a foot sole corresponding to a metacarpophalangeal (MP) joint of the user is thicker than a second portion adjacent to the first portion.

10. The sockliner according to claim 8, wherein in the upper layer portion, a portion included in the rearfoot portion is thicker than a portion adjacent to the portion.

11. The sockliner according to claim 8, wherein in the upper layer portion, a portion that is configured to support a part on a lateral foot side of a foot sole of the user is thicker than a portion that is configured to support a part on a medial foot side of the foot sole of the user.

12. The sockliner according to claim 1, wherein the base layer portion and the upper layer portion are configured of a single component.

13. The sockliner according to claim 12, wherein the base layer portion and the upper layer portion that are configured of a single component are configured of a single additively manufactured product produced by vat polymerization three-dimensional additive manufacturing.

14. The sockliner according to claim 1, further comprising:

a liner that covers an upper surface of the upper layer portion, wherein the liner is made of a woven fabric or a nonwoven fabric.

15. The sockliner according to claim 14, wherein the liner includes a sticky adhesive layer on a main surface located on a side of the upper layer portion, and the liner is fixed to the upper layer portion by affixing the liner onto the upper surface of the upper layer portion with the sticky adhesive layer interposed therebetween.

16. A method of manufacturing the sockliner according to claim 13, the method comprising:

producing the base layer portion; and producing the upper layer portion, wherein in the producing of the base layer portion and the producing of the upper layer portion, by a vat polymerization three-dimensional additive manufacturing method, the base layer portion and the upper layer portion are simultaneously and sequentially accumulated from a rear end area of the rearfoot portion to a front end area of the forefoot portion by additive manufacturing.

17. A method of manufacturing the sockliner according to claim 13, the method comprising:

producing the base layer portion; and producing the upper layer portion, wherein in the producing of the base layer portion and the producing of the upper layer portion, by a vat polymerization three-dimensional additive manufacturing method, at least a part of the base layer portion is simultaneously and sequentially accumulated from a side of the lower surface of the base layer portion in a direction orthogonal to the lower surface of the base layer portion, and subsequently, at least a part of the upper layer portion is simultaneously and sequentially accumulated by additive manufacturing.

* * * * *